(12) United States Patent
Yoshitomi et al.

(10) Patent No.: US 10,802,811 B2
(45) Date of Patent: Oct. 13, 2020

(54) INFORMATION PROCESSING DEVICE, INFORMATION PROCESSING METHOD, COMPUTER PROGRAM, AND SERVER DEVICE

(71) Applicant: SONY CORPORATION, Tokyo (JP)

(72) Inventors: Kosuke Yoshitomi, Kanagawa (JP); Daisuke Nakata, Kanagawa (JP); Takahiro Okayama, Tokyo (JP); Katsuya Hyodo, Kanagawa (JP); Ryo Fukazawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 13 days.

(21) Appl. No.: 15/553,188

(22) PCT Filed: Mar. 2, 2016

(86) PCT No.: PCT/JP2016/056433
§ 371 (c)(1),
(2) Date: Aug. 24, 2017

(87) PCT Pub. No.: WO2016/167039
PCT Pub. Date: Oct. 20, 2016

(65) Prior Publication Data
US 2018/0121185 A1    May 3, 2018

(30) Foreign Application Priority Data

Apr. 14, 2015   (JP) .................................. 2015-082272

(51) Int. Cl.
*G06F 8/61*         (2018.01)
*G06F 9/445*        (2018.01)
*H04L 29/08*        (2006.01)

(52) U.S. Cl.
CPC ................ *G06F 8/61* (2013.01); *G06F 9/445* (2013.01); *H04L 67/26* (2013.01); *H04L 67/34* (2013.01)

(58) Field of Classification Search
CPC .. G06F 8/30–78; G06F 9/445; G06F 8/60–71; H04L 67/26
(Continued)

(56) References Cited

U.S. PATENT DOCUMENTS 8,160,563 B2 *  4/2012  Chen .................... H04L 12/1895
                                                    455/419
8,216,071 B2 *  7/2012  Lee .......................... A63F 13/12
                                                    463/42

(Continued)

FOREIGN PATENT DOCUMENTS

CN        103457994 A    12/2013
CN        104335172 A     2/2015
(Continued)

OTHER PUBLICATIONS

Eronen, Pasi et al., "An expert system for analyzing firewall rules," pp. 1-8, http://www.site.uottawa.ca/~luigi/firewalls/expertsystemfirewall. pdf, retrieved on Feb. 3, 2019. (Year: 2001).*

(Continued)

*Primary Examiner* — Geoffrey R St Leger
(74) *Attorney, Agent, or Firm* — Xsensus LLP

(57) ABSTRACT

Provided is an information processing device including circuitry configured to receive a notification that includes information of an application related to the notification; subject the notification to filtering based upon a filtering condition set in advance of receiving the notification; and automatically install the application on the basis of the information of the application received in the notification

15 Claims, 21 Drawing Sheets

```
sender:www.cafewinter.company.com
expired:2015-1-23,
category:Lifestyle,
urgency:Normal,
title:"Café Winter",
body:"Clearance all items at half price ",
appInfo {
    name: "Café Winter Shpping"
    id: 039284-03938-1,
    sex:femail,
    age:20-40,
    url:https://www.store.domain/app?id=039284-03938-1,
    expired:2020-01-01,
    remove:DataOnly,
    installOnly:false,
    appData{
      salePeriod:2015-1-23
      ...
    }
}
```

(58) Field of Classification Search
USPC .................................................. 717/168–178
See application file for complete search history.

(56) References Cited

U.S. PATENT DOCUMENTS

| | | | | |
|---|---|---|---|---|
| 8,745,612 | B1* | 6/2014 | Semenzato | G06F 8/65 717/170 |
| 8,825,663 | B2* | 9/2014 | Mahaniok | G06F 8/60 707/741 |
| 8,825,842 | B2* | 9/2014 | Papakipos | G06Q 10/10 709/224 |
| 9,280,789 | B2* | 3/2016 | Kirkham | G06Q 30/0631 |
| 9,390,185 | B2* | 7/2016 | Threlkeld | G06F 17/30876 |
| 9,569,196 | B2* | 2/2017 | Das | G06F 8/65 |
| 9,727,326 | B2* | 8/2017 | Ciudad | G06F 8/65 |
| 9,880,832 | B2* | 1/2018 | Plate | G06F 11/366 |
| 9,924,102 | B2* | 3/2018 | Gervautz | H04N 5/23296 |
| 10,026,101 | B2* | 7/2018 | Cassidy | G06Q 30/0269 |
| 10,068,277 | B2* | 9/2018 | Jurgenson | G06F 8/60 |
| 2005/0114389 | A1 | 5/2005 | Kamiya | |
| 2012/0278475 | A1* | 11/2012 | Papakipos | G06Q 10/10 709/224 |
| 2012/0290583 | A1* | 11/2012 | Mahaniok | G06F 8/60 707/741 |
| 2012/0311046 | A1* | 12/2012 | Grigoriev | H04L 45/308 709/206 |
| 2013/0326502 | A1* | 12/2013 | Brunsman | G06F 8/61 717/178 |
| 2014/0052683 | A1* | 2/2014 | Kirkham | G06Q 30/0631 706/46 |
| 2014/0267770 | A1* | 9/2014 | Gervautz | H04N 5/23296 348/169 |
| 2014/0282476 | A1* | 9/2014 | Ciudad | G06F 8/65 717/171 |
| 2015/0082299 | A1* | 3/2015 | Kobayashi | G06F 8/61 717/174 |
| 2015/0113316 | A1* | 4/2015 | Lefrancois des Courtis | G06Q 30/02 714/4.11 |
| 2015/0192975 | A1 | 7/2015 | Kawai et al. | |
| 2015/0254726 | A1* | 9/2015 | Cassidy | G06Q 30/0269 705/14.58 |
| 2015/0309781 | A1* | 10/2015 | Threlkeld | G06F 17/30876 717/176 |
| 2015/0363863 | A1* | 12/2015 | Jurgenson | G06Q 30/0631 705/26.7 |
| 2015/0381433 | A1* | 12/2015 | Kimura | G06F 9/445 709/224 |
| 2016/0179498 | A1* | 6/2016 | Das | G06F 8/65 717/171 |
| 2016/0259636 | A1* | 9/2016 | Plate | G06F 8/68 |

FOREIGN PATENT DOCUMENTS

| | | |
|---|---|---|
| JP | 2005-32159 A | 2/2005 |
| JP | 2005-505154 A | 2/2005 |
| JP | 2005-92469 A | 4/2005 |
| JP | 2005-157657 A | 6/2005 |
| JP | 2005-182189 A | 7/2005 |
| JP | 2005-251167 A | 9/2005 |
| JP | 2008-152797 A | 7/2008 |
| JP | 2010-250732 A | 11/2010 |
| JP | 2013-30865 A | 2/2013 |
| JP | 2014-164392 A | 9/2014 |
| WO | WO 2015/004756 A1 | 1/2015 |

OTHER PUBLICATIONS

International Search Report dated May 17, 2016 in PCT/JP2016/056433.
Tatsuya Tomota, et al., "Human-Centric Computing ni Okeru Smartphone no Doteki Desktop System no Kaihaysu" IPSJ SIG Notes, 2012, vol. 2012-CDS-5, No. 25, pp. 1-8 and cover sheet.
Japanese Office Action dated Dec. 17, 2019, issued in corresponding Japanese Patent Application No. 2017-512223.
Tatsuo Tomita, Tadanobu Tsunoda, Hidenobu Ito, Shinji Fujino, Ichiro Iida, "Development of dynamic desktop system for smart phones in human centric computing", Information Processing Society of Japan SIG Technical Report Apr. 2012 [CD-ROM], Japan, Information Processing Society of Japan, Dec. 15, 2012, vol. 2012-CDS-5, No. 25, pp. 1-8, ISSN 1884-0930.
Office Action dated May 21, 2020 in Chinese Patent Application No. 201680020568.7, 22 pages.
Japanese Office Action dated Jun. 9, 2020 in Japanese Application No. 2017-512223.

* cited by examiner

FIG. 14

```
sender:www.cafewinter.company.com
expired:2015-1-23,
category:Lifestyle,
urgency:Normal,
title:"Café Winter",
body:"Clearance all items at half price",
appInfo {
      name:"Café Winter Shpping"
      id:039284-03938-1,
      sex:femail,
      age:20-40,
      url:https://www.store.domain/app?id=039284-03938-1,
      expired:2020-01-01,
      remove:DataOnly,
      installOnly:false,
      appData[
        salePeriod:2015-1-23
        ...
      }
}
```

FIG. 16

```
sender:www.summerfastival.company.com/2015
expired:2015-8-23,
category:Music,
urgency:Normal,
title:"Summer Festival 2015",
message:"Get exclusive application ",
appInfo {
      name:"Summer Festival 2015 in Fukuoka"
      id:039284-0343a8-a,
      sex: unisexual,
      age: all,
      url:https://www.store.domain/app?id=039284-0343a8-a,
      expired:2015-8-24,
      remove:Complete,
      installOnly:true
}
```

FIG. 17

```
sender:www.summerfastival.company.com/2015
expired:2015-8-23,
category:Music,
urgency:Normal,
title:"Summer Festival 2015",
message:"Welcome!,
appInfo {
    name:"Summer Festival 2015 in Fukuoka"
    id:039284-0343a8-a,
    sex: unisexual,
    age: all,
    url:https://www.store.domain/app?id=039284-0343a8-a,
    expired:2015-8-24,
    remove:Complete,
    installOnly:false,
    appData{
      display: "welcome"
    }
}
```

FIG. 19

```
sender:www.wather.company.com,
expired:None,
category:Wather,
urgency:Urgent,
message:"Earthquake early warning",
appInfo {
      name : "Wather Information"
      id : 039284-0343a8-xx-1
      sex: unisexual,
      age: all,
      url:https://www.store.domain/app?id=039284-0343a8-xx-1,
      expired:2020-01-01,
      remove:Complete,
      installOnly:false,
      appData{
         ...
      }
}
```

INFORMATION PROCESSING DEVICE, INFORMATION PROCESSING METHOD, COMPUTER PROGRAM, AND SERVER DEVICE

TECHNICAL FIELD

The present disclosure relates to an information processing device, an information processing method, a computer program, and a server device.

BACKGROUND ART

There is a technology called push notification in which a device used by a user, such as a personal computer, a smartphone, or a wearable information processing device (hereinafter, those devices are generally referred to as "device"), actively acquires information from a server via a network and notifies the user of the information (see, for example, Patent Literature 1). For example, by using this push notification, the device can immediately notify the user of reception of an email and can notify of the user of an event to be held soon. Further, this push notification can also specify an application to be started by the device and cause the application to be started in the device on the basis of user operation.

CITATION LIST

Patent Literature

Patent Literature 1: JP 2014-225261A

DISCLOSURE OF INVENTION

Technical Problem

However, in order to specify an application by using a push notification and start the application in a device, it is necessary to install the application in the device in advance. However, causing a user of the device to search and install the application in advance is a burden for some users, and, also for a service provider who transmits the push notification, notice and promotion to the user to cause the user to install the application is a burden.

In view of this, the present disclosure proposes an information processing device, an information processing method, a computer program, and a server device, each of which is new, is improved, and is capable of, in response to reception of a push notification in which an application to be started is specified, determining operation to the application.

Solution to Problem

According to the present disclosure, there is provided an information processing device including: a communication unit configured to acquire information of an application that transmits a push notification to a user; and a control unit configured to automatically install the application on the basis of the acquired information.

Further, according to the present disclosure, there is provided an information processing method including: acquiring information of an application that transmits a push notification to a user; and automatically installing the application on the basis of the acquired information.

Further, according to the present disclosure, there is provided a computer program for causing a computer to execute: acquiring information of an application that transmits a push notification to a user; and automatically installing the application on the basis of the acquired information.

Further, according to the present disclosure, there is provided a server device including a communication unit configured to transmit, to an information processing device, information of an application to be automatically installed in the information processing device on the basis of the information of the application that transmits a push notification to a user.

Advantageous Effects of Invention

As described above, according to the present disclosure, it is possible to provide an information processing device, an information processing method, a computer program, and a server device, each of which is new, is improved, and is capable of, in response to reception of a push notification in which an application to be started is specified, determining operation to the application.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 14 is an explanatory view showing an example of notification data.

FIG. 16 is an explanatory view showing an example of notification data.

FIG. 17 is an explanatory view showing an example of notification data.

FIG. 19 is an explanatory view showing an example of notification data.

MODE(S) FOR CARRYING OUT THE INVENTION

Figure 1:
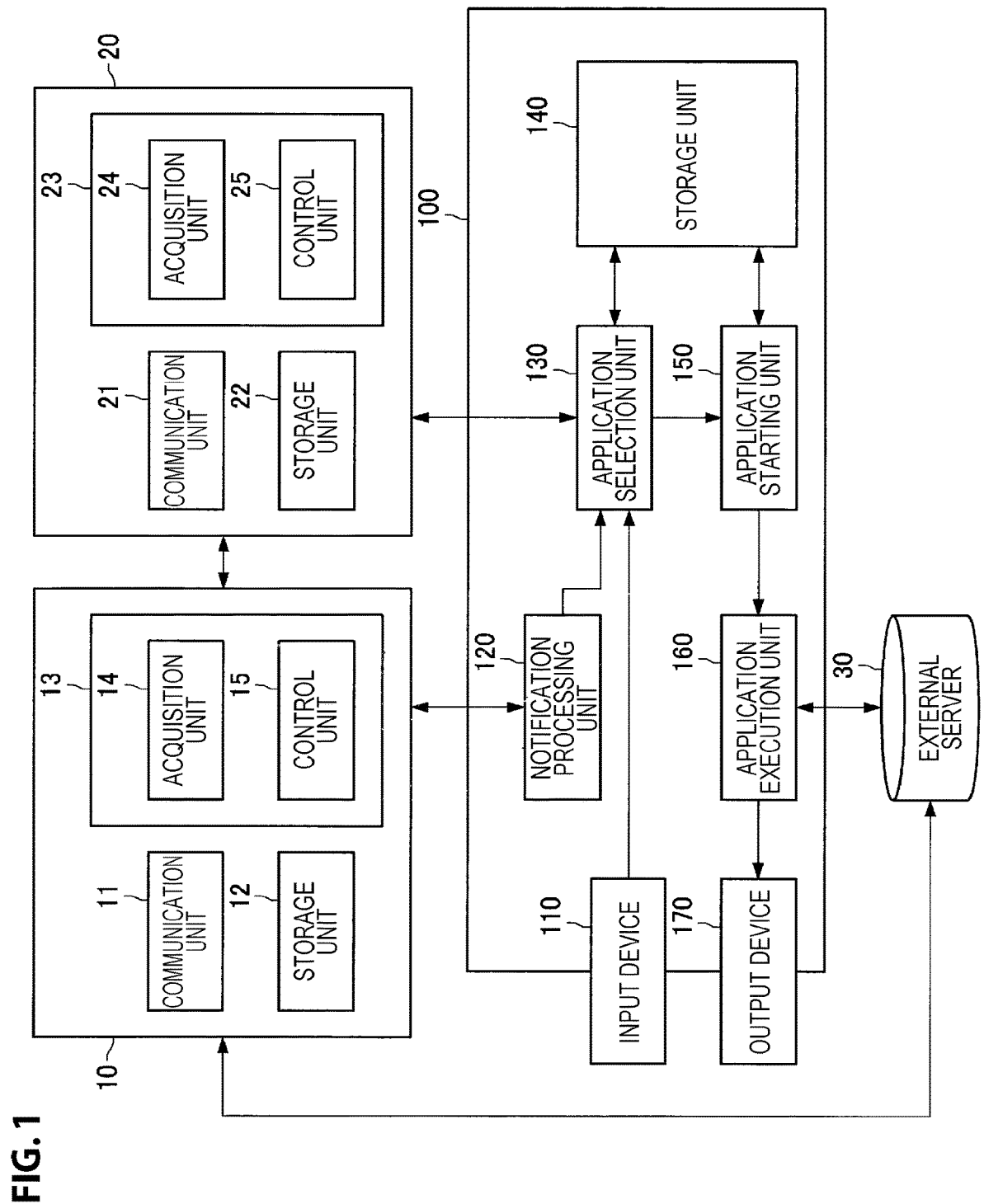
FIG. 1 is an explanatory view showing a functional configuration example of an information processing device 100 according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.

1. Embodiment of present disclosure
1.1. Background
1.2. Functional configuration example
1.3. Operation example
2. Hardware configuration example
3. Conclusion

1. Embodiment of Present Disclosure

1.1. Background

First, a background of an embodiment of the present disclosure will be described before detailed description of the embodiment of the present disclosure.

There is a technology called push notification in which a device used by a user (indicating overall devices that have a function of connecting to a network, such as a personal computer, a smartphone, a tablet terminal, and a wearable device) actively acquires information from a server via a network and notifies the user of the information. For example, by using this push notification, the device can immediately notify the user of reception of an email and can notify of the user of an event to be held soon. Further, this push notification can also specify an application to be started by the device and cause the application to be started in the device on the basis of user operation.

In order to specify an application by using a push notification and start the application in a device, it is necessary to install the application in the device in advance. However, causing a user of the device to search and install the application in advance is a burden for some users, and, also for a service provider who transmits the push notification, notice and promotion to the user to cause the user to install the application is a burden.

The number of applications is continuously increased day by day. An application that is automatically started in response to a push notification exists in applications that have not yet been stored by a user in a device in some cases, and it is difficult for an inexperienced user to search such an application.

Even if a user is caused to install an application in a device in advance and the application can be automatically started when a server transmits a push notification, it is considered that, in a case where a large number of push notifications are transmitted to an information processing device, a large number of applications are automatically started in response to the large number of push notifications. This may confuse the user.

In view of the background described above, a disclosing party of the present disclosure has diligently studied a technology capable of automatically starting an application in response to reception of a push notification, regardless of whether or not the application is installed in a device. As a result, as described below, the disclosing party of the present disclosure has derived a technology capable of automatically starting an application in response to reception of a push notification, regardless of whether or not the application is installed in a device.

Hereinabove, the background of the embodiment of the present disclosure has been described. Next, the embodiment of the present disclosure will be described in detail.

1.2. Functional Configuration Example

First, a functional configuration example of an information processing device 100 according to an embodiment of the present disclosure will be described. FIG. 1 is an explanatory view showing the functional configuration example of the information processing device 100 according to the embodiment of the present disclosure. Hereinafter, the functional configuration example of the information processing device 100 according to the embodiment of the present disclosure will be described with reference to FIG. 1.

The information processing device 100 shown in FIG. 1 is, for example, a smartphone (high-performance mobile phone), a wearable device (indicating a computer device for the purpose of being worn on a body of a user), or the like.

As shown in FIG. 1, the information processing device 100 according to the embodiment of the present disclosure is configured to include an input device 110, a notification processing unit 120, an application selection unit 130, a storage unit 140, an application starting unit 150, an application execution unit 160, and an output device 170.

The input device 110 is various input devices for accepting input from the user and can be made up of, for example, a keyboard, a mouse, or a touchscreen.

Further, various sensing devices can also function as the input device 110. The sensing devices can include, for example, sensors for acquiring a current position, such as a global positioning system (GPS), a global navigation satellite system (GLONASS), a BeiDou navigation satellite system (BDS), and iBeacon, a camera, a camera with depth information, a motion sensor, and a microphone.

Those sensing devices detect acceleration and an angular velocity of the device, a direction, an illuminance, a temperature, an atmospheric pressure, and the like. In a case where, for example, a device including the sensing devices is carried or worn by the user, the various sensing devices can detect various kinds of information as information on the user, for example, as information indicating movement and a direction of the user. In addition, the sensing devices may further include a sensor for detecting biological information on the user, such as a pulse, perspiration, a brain wave, a sense of touch, a sense of smell, and a sense of taste.

The input device 110 outputs information input by the user or generated by sensing to the application selection unit 130.

The notification processing unit 120 receives notification data in which information of an application that transmits a push notification to the user is written, the notification data being transmitted from an external notification server 10 at an arbitrary timing. Upon receipt of the notification data transmitted from the external notification server 10, the notification processing unit 120 analyzes the received notification data and transfers information included in the notification data to the application selection unit 130. The notification processing unit 120 may analyze the notification data transmitted from the external notification server 10 and, depending on a type of notification or content of a target application, may block the information included in the notification data, instead of transferring the information to the application selection unit 130. The notification processing unit 120 can function as an example of a communication unit of an information processing device of the present disclosure.

The notification server 10 is a server for executing a service for transmitting notification data to the information processing device 100. The notification server 10 may not only transmit notification data to the information processing device 100 but also collect information from the information processing device 100. The notification server 10 may collect, for example, position information of the information processing device 100, biological information of the user, and the user's operation history of the information processing device 100 from the information processing device 100.

The notification server 10 is configured to include a communication unit 11, a storage unit 12, and a processing unit 13.

The communication unit 11 performs data communication with another device. For example, the communication unit 11 transmits notification data to the information processing device 100 and receives the above information from the information processing device 100. The storage unit 12 stores information for use in the notification server 10, a computer program for causing the notification server 10 to operate, and the like.

The processing unit 13 provides various functions of the notification server 10. The processing unit 13 includes an acquisition unit 14 and a control unit 15. Note that the processing unit 13 can further include another constituent element in addition to those constituent elements. That is, the processing unit 13 can also perform operation in addition to operation of those constituent elements.

The acquisition unit 14 acquires information for operation of the notification server 10 and information received from another device. The acquisition unit 14 can acquire the information for operation of the notification server 10 and a computer program from the storage unit 12. For example, the acquisition unit 14 acquires position information of the information processing device 100, biological information of the user, the user's operation history of the information processing device 100, and the like and stores the acquired information on the storage unit 12 as necessary.

The control unit 15 controls operation of the notification server 10. The control unit 15 can operate on the basis of information acquired by the acquisition unit 14. For example, the control unit 15 executes processing of generating notification data to be transmitted to the information processing device 100 and processing of transmitting the generated notification data to the information processing device 100 via the communication unit 11.

An application distribution server 20 is a server for executing a service for managing an application that operates in the information processing device 100 and distributing the application to the information processing device 100 in response to a request from the information processing device 100. The application distribution server 20 may provide information of an application matching a search condition to the information processing device 100 in response to a search request of the application from the information processing device 100. Further, at the time of distributing the application, the application distribution server 20 may charge for the application in order to grant usage authorization of the application to the information processing device 100.

The application distribution server 20 is configured to include a communication unit 21, a storage unit 22, and a processing unit 23.

The communication unit 21 performs data communication with another device. For example, the communication unit 21 transmits execution data of an application to the information processing device 100. Further, for example, the communication unit 21 receives a search request of an application from the information processing device 100 and transmits information of an application matching a search condition. The storage unit 22 stores information for use in the application distribution server 20, a computer program for causing the application distribution server 20 to operate, execution data of an application executed in the information processing device 100, and the like.

The processing unit 23 provides various functions of the application distribution server 20. The processing unit 23 includes an acquisition unit 24 and a control unit 25. Note that the processing unit 23 can further include another constituent element in addition to those constituent elements. That is, the processing unit 23 can also perform operation in addition to operation of those constituent elements.

The acquisition unit 24 acquires information for operation of the application distribution server 20 and information received from another device. The acquisition unit 24 can acquire the information for operation of the application distribution server 20 and a computer program from the storage unit 22.

The control unit 25 controls operation of the application distribution server 20. The control unit 25 can operate on the basis of information acquired by the acquisition unit 24. For example, the control unit 25 executes processing of, in response to a request of an application from the information processing device 100, acquiring execution data of the application from the storage unit 22 and transmitting the execution data of the application to the information processing device 100 via the communication unit 21. Further, for example, at the time of transmitting an application to the information processing device 100, the control unit 25 may perform processing for charging for the application in order to grant usage authorization of the application to the information processing device 100.

An external server 30 is a server for providing an external service that transmits/receives information to/from an application executed by the information processing device 100. The external server 30 can be provided for each external service. The external server 30 cooperates with the notification server 10 and transmits, to, for example, the notification server 10, a trigger serving as an opportunity to transmit notification data to the information processing device 100.

The notification server 10 may transmit notification data to the information processing device 100 via the communication unit 11 on the basis of, for example, an instruction from the external server 30 for executing an external service or may transmit notification data to the information processing device 100 via the communication unit 11 in a case where the information processing device 100 satisfies a notification condition registered in advance from the external server 30.

Note that, in the configuration example shown in FIG. 1, the notification server 10, the application distribution server 20, and the external server 30 are shown as separate devices. However, the present disclosure is not limited to this example. For example, the notification server 10 and the application distribution server 20 may be integrated as a single server device. When the notification server 10 and the application distribution server 20 are integrated as a single server device, the server device can function as an example of a server device of the present disclosure.

In notification data transmitted from the external notification server 10 (for example, communication unit 11), information of an application that transmits a push notification to the user is written as described above, and the notification data can include, for example, a transmission source, a term of validity of a notification, a category of the notification, a degree of urgency of the notification, and information of the application to be started. The information of the application to be started can include, for example, a name of the application, an identifier for uniquely identifying the application, sex of a target, age of the target, a source of supply of the application (URL, identifier, or the like), a term of validity of the application, a complete deletion determination flag of the application (in a case where a value is True, the application including data is deleted at the time of deletion), an install only flag of the application (in a case where a value is True, only installation is performed), a starting condition of the application (specifying that, for example, the application is started only in response to a notification or the application can be started by user operation), and information inherent to the application. A structure of the notification data will be described in detail below.

The install only flag is a flag for determining whether the application selection unit 130 downloads an application from the application distribution server 20, installs the application, and starts the installed application or only installs the application. By setting the install only flag, in the application executed in the information processing device 100, it is possible to separate a timing of installing the application from a timing of starting the application. As a case where it is desirable to separate a timing of installing an application from a timing of starting the application, for example, the following cases are considered: a case where a location where the application is executed is expected to be a location where a network is hardly connected; and a case where it is desirable to install the application via Wi-Fi or the like in advance because the application has a large size.

The application selection unit 130 selects an application to be started. When the application selection unit 130 selects the application to be started, the application selection unit 130 transfers information of the selected application to the application starting unit 150. The application selection unit 130 changes operation to the application depending on whether the application has been explicitly selected by the user or has been selected on the basis of data transmitted from the external notification server 10 (for example, communication unit 11). The application selection unit 130 can function as an example of a control unit of the information processing device of the present disclosure.

In a case where the user explicitly selects an application to be started by using the input device 110, the application selection unit 130 selects an application stored on the storage unit 140 on the basis of input by the user. Meanwhile, in a case where an application is automatically started in response to a notification from the external notification server 10, the application selection unit 130 determines an application to be started on the basis of information transferred from the notification processing unit 120. In a case where the application selection unit 130 determines an application to be started on the basis of information transferred from the notification processing unit 120, the application selection unit 130 determines whether or not the application is stored on the storage unit 140. In a case where the application to be started is stored on the storage unit 140, the application selection unit 130 selects the application stored on the storage unit 140. Meanwhile, in a case where the application to be started is not stored on the storage unit 140, the application selection unit 130 downloads the application from the external application distribution server 20 and stores (installs) the downloaded application on the storage unit 140. Note that the application selection unit 130 may delete (uninstall) the application stored on the storage unit 140.

The storage unit 140 stores an application to be started by the application starting unit 150 and can be configured as, for example, a non-volatile memory such as a flash memory. The storage unit 140 stores, for example, a substance of the application, data generated by executing the application, and information on a storage location (for example, URL) of the application. The storage unit 140 stores an application downloaded by the application selection unit 130. The information stored on the storage unit 140 is referred to by the application selection unit 130 and the application starting unit 150. Further, the application stored on the storage unit 140 can be deleted as necessary.

The application starting unit 150 is an example of the control unit of the present disclosure and reads out an application selected by the application selection unit 130 from the storage unit 140 and starts the application. Further, at the time of terminating the application, the application starting unit 150 performs predetermined termination processing such as deletion of unnecessary data and recording that the application has been started. Further, at the time of starting or terminating of the application, the application starting unit 150 also performs payment processing of a fee charged for the application as necessary in order to obtain usage authorization of the application. The application starting unit 150 can also function as an example of the control unit of the information processing device of the present disclosure.

The application starting unit 150 acquires and manages statistics information of the application. The statistics information of the application can include, for example, timings of starting and terminating the application and a starting time of the application. In addition, the application starting unit 150 may instruct the application selection unit 130 to uninstall the application on the basis of user operation, a notification from a notification service, the statistics information of the application, or the like.

The application execution unit 160 presents a user interface (UI), sound, an image, or the like generated as a result of starting an application by the application starting unit 150 to the user via the output device 170. The application execution unit 160 exchanges information with the external server 30 by communicating therewith as necessary.

The output device 170 is a device for presenting a UI, sound, an image, and the like presented by the application execution unit 160 to the user and is made up of, for example, a display, a speaker, or a vibrator. The output device 170 presents, to the user, not only the UI, the sound, the image, and the like presented by the application execution unit 160 but also a UI, sound, an image, and the like based on notification data that the notification processing unit 120 receives from the notification server 10.

Note that the input device 110 and the output device 170 in the information processing device 100 shown in FIG. 1 may be devices separate from the information processing device 100.

The information processing device 100 according to the embodiment of the present disclosure has the configuration shown in FIG. 1, and therefore the information processing device 100 can automatically start an application in response to reception of a push notification, regardless of whether or not the application automatically started in response to reception of the push notification is installed in the information processing device 100.

Hereinabove, the functional configuration example of the information processing device 100 according to the embodiment of the present disclosure has been described with reference to FIG. 1. Next, an operation example of the information processing device 100 according to the embodiment of the present disclosure will be described.

1.3. Operation Example

Figure 2:
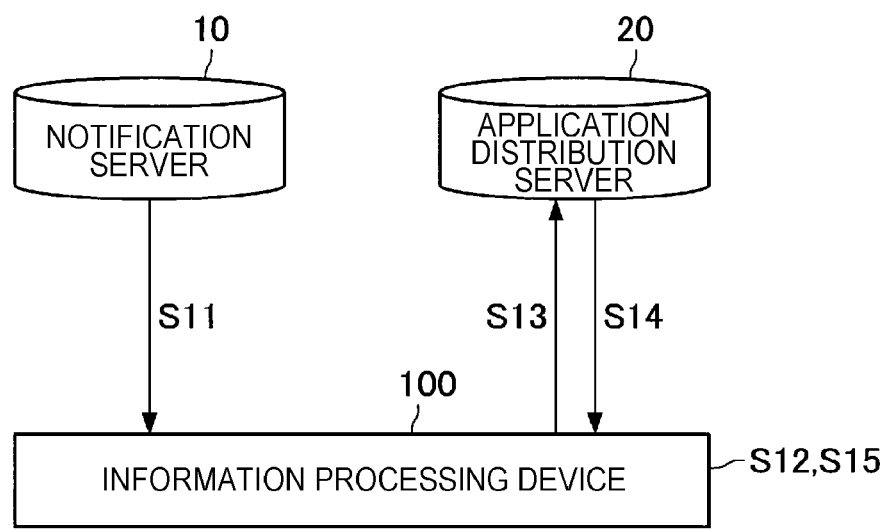
FIG. 2 is an explanatory view showing an application downloading method of an information processing device 100 according to an embodiment of the present disclosure.
Figure 3:
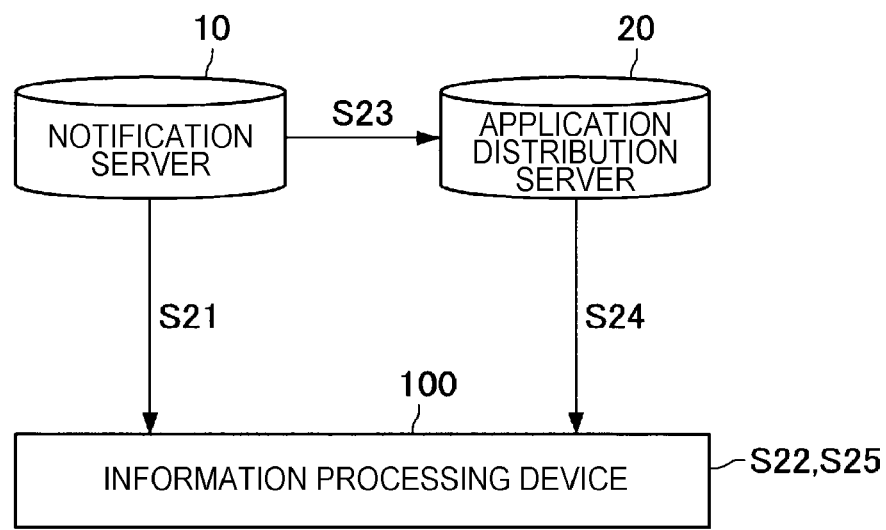
FIG. 3 is an explanatory view showing an application downloading method of an information processing device 100 according to an embodiment of the present disclosure.

First, an application downloading method of the information processing device 100 according to the embodiment of the present disclosure will be described. FIGS. 2 and 3 are explanatory views showing application downloading methods of the information processing device 100 according to the embodiment of the present disclosure. Both FIGS. 2 and 3 show application downloading methods performed in a case where an application is downloaded from the application distribution server 20 on the basis of reception of notification data from the notification server 10.

FIG. 2 shows an explanatory view showing an application downloading method performed in a case where the information processing device 100 generates a request for downloading an application. When the notification server 10 transmits notification data from, for example, the control unit 15 via the communication unit 11 (Step S11), the information processing device 100 receives the notification data (Step S12).

In a case where the application to be started in response to the notification data is not installed, the information processing device 100 transmits a request for downloading the application to the application distribution server 20 (Step S13). In the application distribution server 20, for example, the acquisition unit 24 acquires the application from the storage unit 22, and the application is distributed from the control unit 25 via the communication unit 21 in response to the request from the information processing device 100. In other words, the information processing device 100 downloads the application requested to be downloaded from the application distribution server 20 (Step S14). Then, the information processing device 100 installs the application downloaded from the application distribution server 20 (Step S15).

FIG. 3 shows an explanatory view showing an application downloading method performed in a case where a notification service provided by the notification server 10 and an application distribution service provided by the application distribution server 20 cooperate with each other. Also in a case where the notification service and the application distribution service cooperate with each other, when the notification server 10 transmits notification data (Step S21), the information processing device 100 receives the notification data (Step S22).

Furthermore, the notification server 10 also transmits the notification data to the application distribution server 20 (Step S23). Upon receipt of the notification data from the notification server 10, the application distribution server 20 distributes an application to be started in the information processing device 100 in response to the notification data to the information processing device 100 to which the notification server 10 has transmitted the notification data (Step S24). Therefore, the application distribution server 20 distributes the application to the information processing device 100 in a push format.

Then, the information processing device 100 installs the application transmitted from the application distribution server 20 (Step S25).

The information processing device 100 according to the present embodiment downloads an application from the application distribution server 20 on the basis of reception of notification data from the notification server 10 by using any one of the above two application downloading methods.

Hereinabove, the application downloading methods of the information processing device 100 according to the embodiment of the present disclosure have been described with reference to FIGS. 2 and 3. Next, an operation example of the information processing device 100 according to the embodiment of the present disclosure will be described in detail.

Figure 4:
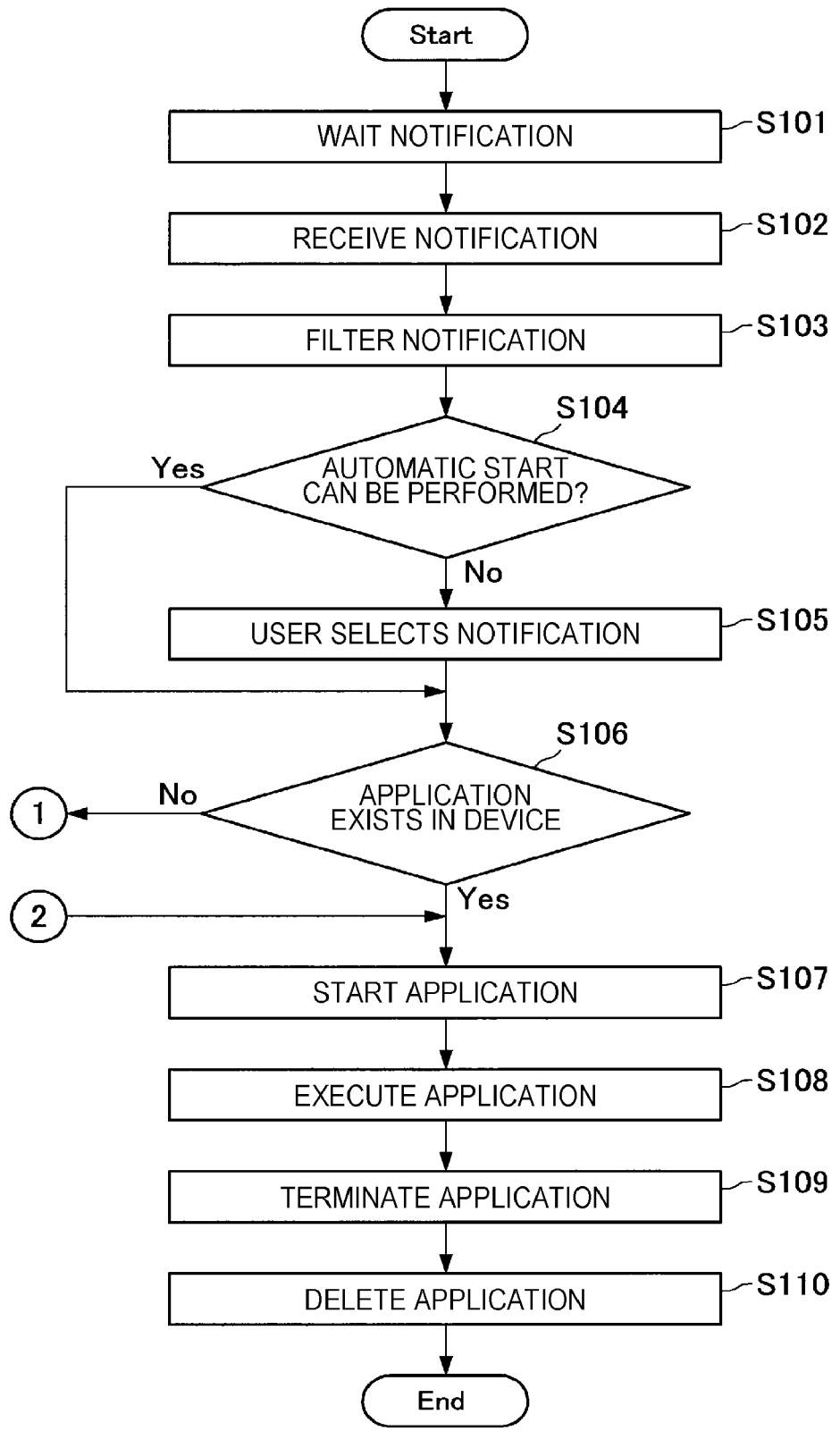
FIG. 4 is a flowchart showing an operation example of an information processing device 100 according to an embodiment of the present disclosure.
Figure 5:
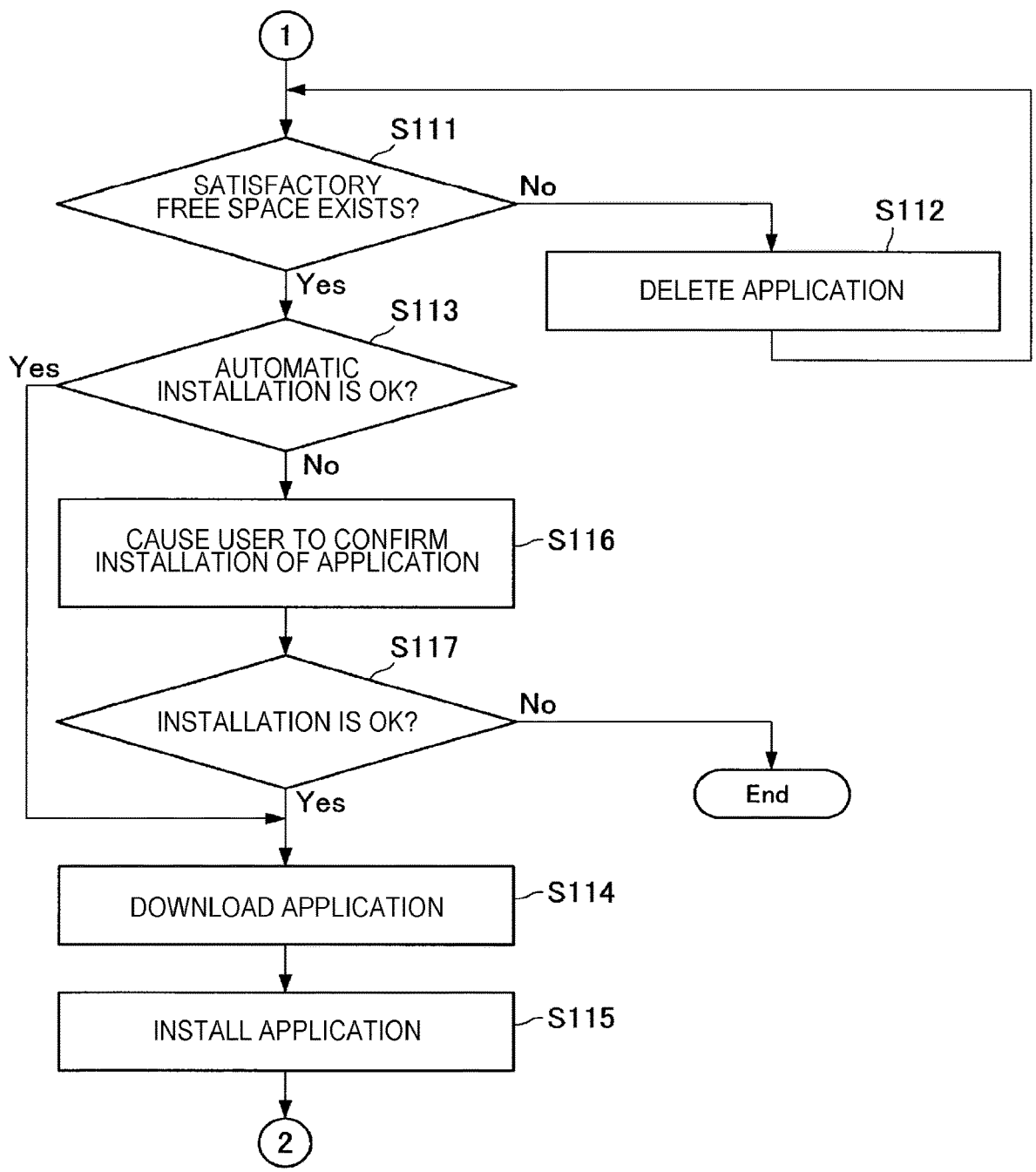
FIG. 5 is a flowchart showing an operation example of an information processing device 100 according to an embodiment of the present disclosure.

FIGS. 4 and 5 are flowcharts showing an operation example of the information processing device 100 according to the embodiment of the present disclosure. FIGS. 4 and 5 show the operation example of the information processing device 100 performed in a case where notification data is received from the notification server 10, an application is started on the basis of the notification data, and the application is finally deleted. Note that, in the following description, "the notification server 10 (for example, communication unit 11) transmits notification data" will also be referred to simply as "the notification server 10 transmits a notification", and "the information processing device 100 (for example, notification processing unit 120) receives notification data from the notification server 10" will also be referred to simply as "the information processing device 100 receives a notification". Hereinafter, the operation example of the information processing device 100 according to the embodiment of the present disclosure will be described with reference to FIGS. 4 and 5.

In a state in which the information processing device 100 waits a notification from the notification server 10 (Step S101), the information processing device 100 receives a notification from the notification server 10 (Step S102). Reception of the notification from the notification server 10 in Step S102 is executed by, for example, the notification processing unit 120.

Upon receipt of the notification from the notification server 10 in Step S102, the information processing device 100 filters the notification from the notification server 10 (Step S103). Filtering of the notification in Step S103 may be executed by, for example, the notification processing unit 120 or the application selection unit 130.

Herein, filtering processing of a notification from the notification server 10 will be described. The information processing device 100 automatically starts an application on the basis of a notification from the notification server 10. However, in a case where the information processing device 100 responds to all notifications, an application that is not necessarily important for a user may also be automatically started when a large number of notifications are received in a short time.

In view of this, in the present embodiment, the information processing device 100 may have a function of filtering notifications from the notification server 10. Based on, for example, a filtering condition set in advance, the information processing device 100 operates so that a notification whose value is determined to be low by the user is not responded and the notification is discarded. Further, the information processing device 100 operates so as to not only filter notifications from the notification server 10 but also sort the notifications, thereby arranging the notifications to be displayed on the output device 170.

Conditions of the above filtering and sorting can encompass, for example, a notification type, application information, feedback on a past notification by the user, a profile of the user such as age and sex, and a user context. The user context can encompass an activity status of the user, behavior of the user obtained by analyzing sensing data, a starting status of an application in the information processing device 100, and the like.

In a case where the notification type is set as a condition of filtering, the information processing device 100 may perform filtering, such as discarding a notification whose degree of urgency is equal to or less than a predetermined threshold, discarding a notification whose term of validity is later than a predetermined term, discarding a notification other than a notification from a service registered by the user, and discarding a notification other than a notification in a category in which the user is interested.

In a case where the notification type is set as a condition of sorting, the information processing device 100 may perform sorting, such as sorting notifications in order from a notification having the highest degree of urgency, sorting notifications in order from a notification having the shortest term of validity, sorting notifications in order from a notification of a service registered by the user, and sorting notifications in order from a notification of a category in which the user is interested.

In a case where the application information is set as a condition for filtering, the information processing device 100 may perform filtering, such as discarding a notification of an application whose rating (indicating evaluation of the application by another user in a numerical form) is equal to or less than a predetermined threshold, discarding a notification whose developer does not match a predetermined condition, discarding a notification of an application whose evaluation result is equal to or less than a predetermined threshold, discarding a notification of an application whose language does not match a predetermined condition, and discarding a notification of an application whose permission necessary for the application does not match a predetermined condition. The permission necessary for the application is, for example, whether or not the application needs to connect to a network and whether or not the application needs to access the device.

In a case where the application information is a condition of sorting, the information processing device 100 may perform sorting, such as sorting notifications in order from a notification of an application having the highest rating, sorting notifications in order from a notification whose developer matches a predetermined condition, sorting notifications in order from a notification of an application having the highest evaluation result, sorting notifications in order from a notification of an application whose language matches a predetermined condition, and sorting notifications in order from a notification of an application whose permission necessary for the application matches a predetermined condition.

The information processing device 100 may automatically delete a notification whose presentation to the user is considered to be unnecessary on the basis of the above condition of filtering. The information processing device 100 does not display a notification whose presentation to the user is considered to be unnecessary on the output device 170, and, in a case where an application to be started in response to the notification is not installed, the information processing device 100 does not download the application from the application distribution server 20.

The conditions of filtering and sorting may be set to the information processing device 100 by the user in advance or may be appropriately changed by learning by the information processing device 100. For example, in a case where the information processing device 100 can grasp that the user frequently uses an application in a specified genre on the basis of a starting history of applications, the information processing device 100 may not delete a notification to an application in the genre and may delete a notification to an application in a genre different from the genre or a genre having a bad compatibility with the genre. Even in a case where a plurality of applications having a similar function or a plurality of applications belonging to a similar genre exist in the information processing device 100, it is highly possible that the user of the information processing device 100 only needs a single application among those applications. In addition, it is highly possible that an application that the user does not need is not used. Therefore, it may be determined that the plurality of applications having the similar function and the applications belonging to the similar genre may have bad compatibility. For example, the following cases are considered as bad compatibility between applications.

Combination of applications in the same category (genre)

For example, a baseball application and a soccer application, both of which belong to a sport category, have bad compatibility.

Combinations of applications having the same function

For example, a running application and a map application, both of which have a function of navigating a current position, have bad compatibility.

Difference in language

For example, an application prepared in Japanese and an application prepared in English have bad compatibility.

When the information processing device 100 filters a notification in Step S103, then the information processing device 100 determines whether or not an application to be started in response to a notification that has not been deleted by the filtering in Step S103 is an application that can be automatically started (Step S104). This determination in Step S104 is executed by, for example, the application selection unit 130.

As a result of the determination in Step S104, in a case where the application is not an application that can be automatically started (Step S104, No), the information processing device 100 instructs the user to start the application (Step S105). The instruction in Step S105 is output to, for example, the output device 170 in the form of a letter, an image, sound, vibration, or the like. As a result of the determination in Step S104, in a case where the application is an application that can be automatically started (Step S104, Yes) or in a case where the information processing device 100 instructs the user to start the application in Step S105 and the user selects to start the application in response to the instruction (Step S105), then the information processing device 100 determines whether or not the application is installed in the information processing device 100 (Step S106). The determination in Step S106 is executed by, for example, the application selection unit 130.

As a result of the determination in Step S106, in a case where the application is installed in the information processing device 100 (Step S106, Yes), the information processing device 100 starts the application (Step S107). The start processing in Step S107 is executed by, for example, the application starting unit 150. When the information processing device 100 starts the application in Step S107, the information processing device 100 executes the application (Step S108). The execution processing in Step S108 is executed by, for example, the application execution unit 160.

The user can operate the application executed in Step S108 by using the input device 110. Then, when the user performs operation to terminate the application executed in Step S108 by using the input device 110, the information processing device 100 performs termination processing of the application (Step S109) and further performs deletion processing of the terminated application as necessary (Step S110). The termination processing in Step S109 is executed by, for example, the application execution unit 160, and the deletion processing in Step S110 is executed by, for example, the application starting unit 150.

On the contrary, as a result of the determination in Step S106, in a case where the application is not installed in the information processing device 100 (Step S106, No), the information processing device 100 determines whether or not a satisfactory free space for installing the application exists in the storage unit 140 (Step S111). The determination in Step S111 is executed by, for example, the application selection unit 130. Existence of the satisfactory free space for installing the application may mean that, for example, an enough free space to store a substance of the application exists, or means that, for example, an enough free space to store not only the substance of the application but also data generated by executing the application exists.

As a result of the determination in Step S111, in a case where the satisfactory free space for installing the application does not exist in the storage unit 140 (Step S111, No), the information processing device 100 deletes an application that satisfies a predetermined deletion condition among other applications stored on the storage unit 140 (Step S112). The deletion processing in Step S112 is executed by, for example, the application selection unit 130. The deletion processing of the application will be described in detail below.

When the deletion processing in Step S112 is executed, the information processing device 100 returns to the determination processing in Step S111 again, and repeats the deletion processing until the satisfactory free space for installing the application to be started on the basis of the notification can be secured in the storage unit 140.

On the contrary, as a result of the determination in Step S111, in a case where the satisfactory free space for installing the application exists in the storage unit 140 (Step S111, Yes), the information processing device 100 determines whether or not the application to be installed is an application that can be automatically installed (Step S113). The determination in Step S113 is executed by, for example, the application selection unit 130.

As a result of the determination in Step S113, in a case where the application to be installed is an application that can be automatically installed (Step S113, Yes), the information processing device 100 downloads the application from the application distribution server 20 (Step S114) and installs the downloaded application (Step S115). The processing in Steps S114 and S115 is executed by, for example, the application selection unit 130. When the installation processing of the application in Step S115 is completed, the information processing device 100 transitions to the application start processing in Step S107 of FIG. 4.

On the contrary, as a result of the determination in Step S113, in a case where the application to be installed is not an application that can be automatically installed (Step S113, No), the information processing device 100 performs processing of causing the user to confirm whether to download the application from the application distribution server 20 and install the application (Step S116). The confirmation processing in Step S116 is executed by, for example, the application selection unit 130. The information processing device 100 may perform this confirmation by, for example, outputting a predetermined user interface to the display of the output device 170 or by outputting predetermined sound from the speaker of the output device 170.

Then, the information processing device 100 determines whether or not installation of the application has been permitted by the user (Step S117). The determination in Step S117 is executed by, for example, the application selection unit 130.

As a result of the determination in Step S117, in a case where installation of the application is permitted by the user (Step S117, Yes), then the information processing device 100 downloads the application from the application distribution server 20 (Step S114) and installs the downloaded application (Step S115). On the contrary, as a result of the determination in Step S117, in a case where installation of the application is not permitted by the user (Step S117, No), then the information processing device 100 terminates a series of processing without downloading the application.

By executing the series of processing shown in FIGS. 4 and 5, in response to reception of a notification from the notification server 10, the information processing device 100 according to the embodiment of the present disclosure can start an application in a case where the application to be started in response to the notification is installed. In a case where the application to be started in response to the notification is not installed, the information processing device 100 according to the embodiment of the present disclosure can download the application from the application distribution server 20, install the downloaded application, and start the installed application.

Note that, in a case where an application in which the above install only flag is set to True is downloaded from the application distribution server 20, the information processing device 100 only installs the application and does not start the installed application.

Hereinabove, the operation example of the information processing device 100 according to the embodiment of the present disclosure has been described with reference to FIGS. 4 and 5.

As described above, in a case where an application to be started in response to a notification is not installed, the information processing device 100 according to the embodiment of the present disclosure can automatically download the application from the application distribution server 20 and install the downloaded application. However, it is expected that an enough space to install the downloaded application cannot be secured in the storage unit 140 in some cases.

In view of this, in a case where an application that satisfies a predetermined deletion condition exists among applications that have been automatically downloaded, the information processing device 100 according to the embodiment of the present disclosure may delete the application from the storage unit 140.

Figure 6:
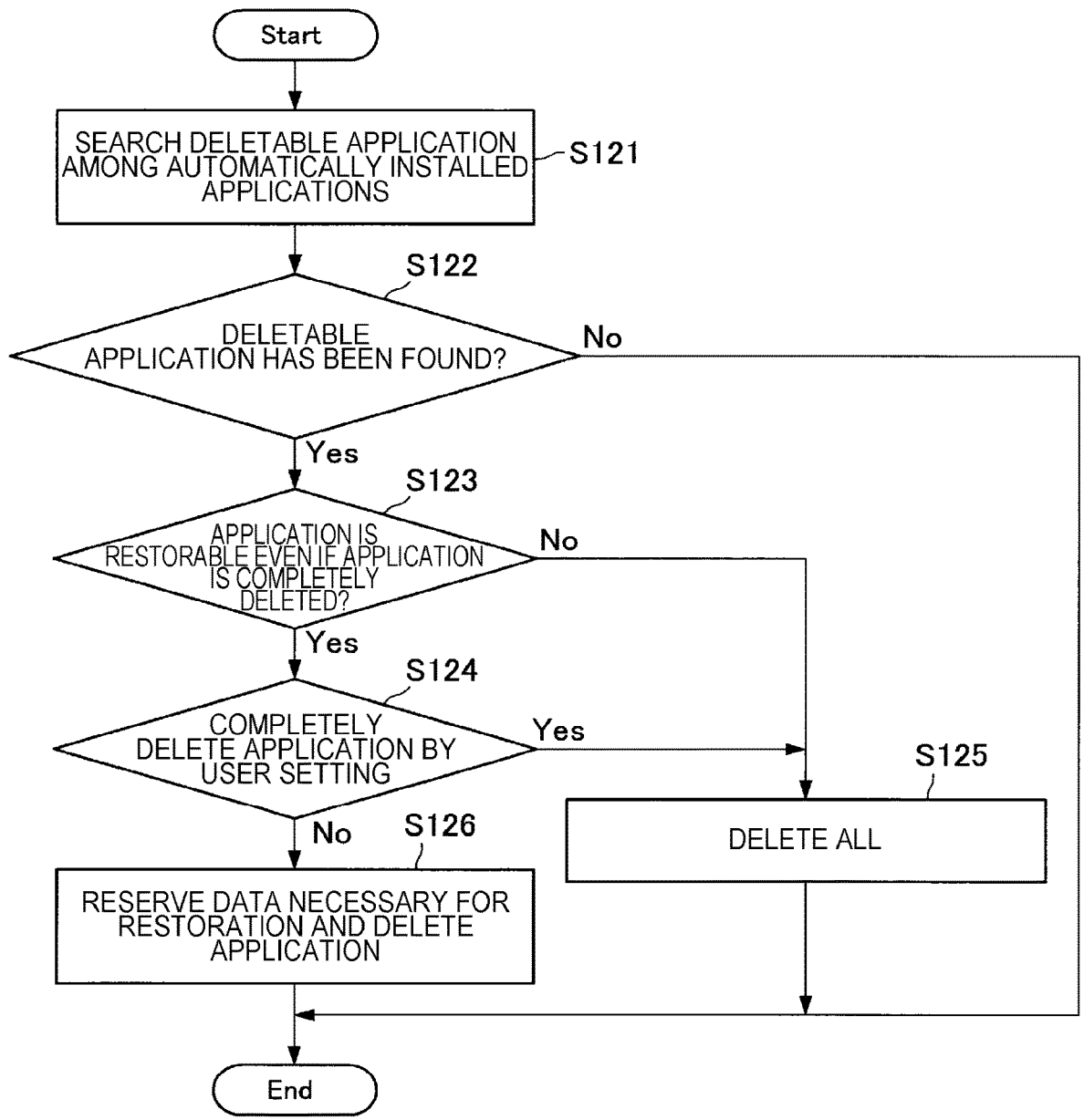
FIG. 6 is a flowchart showing an operation example of an information processing device 100 according to an embodiment of the present disclosure.

FIG. 6 is a flowchart showing an operation example of the information processing device 100 according to the embodiment of the present disclosure. FIG. 6 shows the operation example of the information processing device 100 according to the embodiment of the present disclosure, which is performed in a case where, when an application that satisfies a predetermined deletion condition exists among applications that have been automatically downloaded, the application is deleted from the storage unit 140. Hereinafter, the operation example of the information processing device 100 according to the embodiment of the present disclosure will be described with reference to FIG. 6.

In a case of deleting an application, first, the information processing device 100 searches, from the storage unit 140, an application that satisfies a predetermined deletion condition and is deletable among applications that have been dynamically downloaded among applications automatically downloaded from the application distribution server 20 (Step S121). The processing in Step S121 is executed by, for example, the application selection unit 130.

When the search processing in Step S121 is executed, then, as a result of the search, the information processing device 100 determines whether or not the deletable application exists (Step S122). The determination processing in Step S122 is executed by, for example, the application selection unit 130.

As a result of the determination in Step S122, in a case where the deletable application does not exist (Step S122, No), the information processing device 100 deletes no application and terminates the processing. On the contrary, as a result of the determination in Step S122, in a case where the deletable application exists (Step S122, Yes), then the information processing device 100 determines whether or not the deletable application is restorable even if the application is completely deleted (which means that all data including data generated by the application is deleted) (Step S123). The determination processing in Step S123 is executed by, for example, the application selection unit 130.

As a result of the determination in Step S123, in a case where the application is an application that is restorable even if the application is completely deleted (Step S123, Yes), then the information processing device 100 determines whether or not the application is set to be completely deleted by a user setting (Step S124). The determination processing in Step S124 is executed by, for example, the application selection unit 130.

As a result of the determination in Step S124, in a case where the application is set to be completely deleted by the user setting (Step S124, Yes), the information processing device 100 completely deletes the application from the storage unit 140 (Step S125). The deletion processing in Step S125 is executed by, for example, the application selection unit 130. Note that, as a result of the determination in Step S123, also in a case where the application is not an application that is restorable when the application is completely deleted (Step S123, No), the information processing device 100 completely deletes the application from the storage unit 140 (Step S125). On the contrary, as a result of the determination in Step S124, in a case where the application is not set to be completely deleted by the user setting (Step S124, No), the information processing device 100 reserves data necessary for restoring the application and deletes only execution data from the storage unit 140 (Step S126).

When the information processing device 100 automatically deletes an application that has been automatically downloaded from the application distribution server 20, the information processing device 100 may transmit information on the deleted application to the application distribution server 20. The application distribution server 20 stores, on the storage unit 22, information on which application has been automatically downloaded in which information processing device 100, and therefore, for example, the control unit 25 can grasp which application has been automatically downloaded in which information processing device 100, and, in addition, for example, the control unit 25 can grasp which application that was automatically downloaded has been deleted.

Various deletion conditions are considered. For example, expiring of a term of validity of an application, receiving, from the user, feedback showing that an application may be deleted, and determining that an application may be deleted on the basis of a usage status of the user are considered as the deletion conditions. In a case where the usage status of the user is set as the deletion condition, an application that is determined not to be frequently used on the basis of a frequency of use by the user, an application that is determined to have not been used for a long time on the basis of the latest date and time of use by the user, and an application that is determined to have difficulty in being used in a current network bandwidth may be set as a target to be deleted.

The information processing device 100 may delete an application that has been automatically downloaded without confirmation by the user and satisfies a predetermined deletion condition or may seek confirmation from the user before deletion. Further, in a case where the user provides a setting in which the user does not desire to delete an application, the information processing device 100 may not delete an application even in a case where the application is an application that satisfies a predetermined deletion condition.

Figure 7:
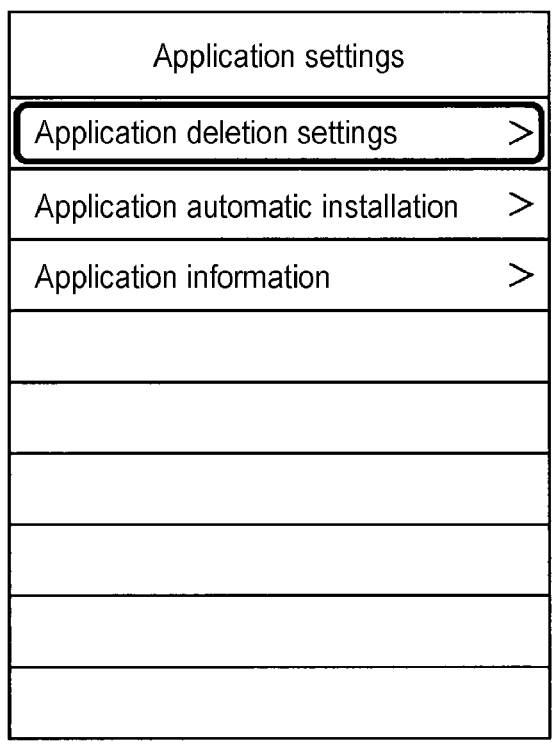
FIG. 7 is an explanatory view showing an example of a user interface.
Figure 8:
FIG. 8 is an explanatory view showing an example of a user interface.
Figure 9:
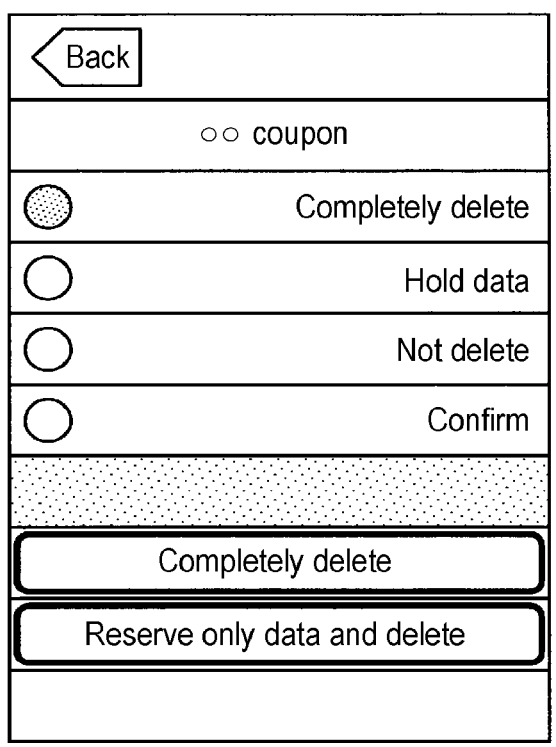
FIG. 9 is an explanatory view showing an example of a user interface.

FIGS. 7 to 9 are explanatory views showing examples of a user interface presented by the information processing device 100 to the user in order to cause the user to provide a setting for automatically deleting an application. The user interfaces shown in FIG. 7 to FIG. 9 are displayed on, for example, the display of the output device 170.

FIG. 7 is an explanatory view showing an example of a user interface that presents a list of settings regarding an application (application settings). When the user selects "Application deletion settings", the information processing device 100 transitions to a user interface that presents a list of settings regarding deletion of an application.

FIG. 8 is an explanatory view showing an example of a user interface that presents a list of settings regarding deletion of an application. FIG. 8 shows an example of a user interface that displays a user interface on which a deletion setting for each installed application is displayed. When the user selects a frame in which a name of an application (for example, "○○ coupon") is displayed, the information processing device 100 transitions to a user interface for causing a deletion setting of the application to be set.

FIG. 9 is an explanatory view showing an example of a user interface for causing the user to set a deletion setting of an individual application. FIG. 9 shows an example of a user interface on which four settings, i.e., "Completely delete" "Hold data", "Not delete", and "Confirm", are displayed as deletion settings of an application. When the user selects "Completely delete", in the application, all data including data generated by the application is deleted at the time of deletion. When the user selects "Hold data", in the application, all data including data generated by the application is deleted at the time of deletion. The application is deleted while data generated by the application is being reserved at the time of deletion. When the user selects "Hold data", the application is not automatically deleted even in a case where the application satisfies a deletion condition. When the user selects "Confirm", confirmation from the user is sought at the time of deletion and, in a case where the user permits deletion, the application is deleted.

The information processing device 100 may execute deletion processing at a time when a storage space of the storage unit 140 becomes equal to or less than a predetermined value, may regularly execute the deletion processing, or may execute the deletion processing in response to an instruction from the user.

By executing a series of processing shown in FIG. 6, in a case where an application that satisfies a predetermined deletion condition exists among applications that have been automatically downloaded, the information processing device 100 according to the embodiment of the present disclosure can delete the application from the storage unit 140. In a case of deleting an application from the storage unit 140, the information processing device 100 according to the embodiment of the present disclosure can determine which data to delete in accordance with a user setting and appropriately delete an application.

As described above, in a case where an application to be started in response to a notification is not installed, the information processing device 100 according to the embodiment of the present disclosure can automatically download the application from the application distribution server 20 and install the downloaded application. However, when applications are installed in response to all notifications, the free space of the storage unit 140 is reduced or the user cannot grasp which application is installed.

In view of this, the information processing device 100 according to the embodiment of the present disclosure may determine whether to automatically download and install an application on the basis of content of a notification, application information, a user setting, or the like.

For example, in a case where a notification transmitted as a notification whose degree of urgency is high is received, the information processing device 100 may automatically download and install an application, and, in a case where a notification transmitted as a notification whose degree of urgency is not high is received, the information processing device 100 may seek confirmation from the user before an application is automatically downloaded and installed.

Further, for example, in a case where the user receives a notification from a service registered in advance, the information processing device 100 may automatically download and install an application, and, in a case where the user receives a notification from a service that is not a service registered in advance, the information processing device 100 may seek confirmation from the user before an application is automatically downloaded and installed.

Further, in a case where the application information is set as a condition of automatic installation, for example, the information processing device 100 may install an application whose rating (indicating evaluation of the application by another user in a numerical form) is equal to or greater than a predetermined threshold, may install an application whose developer matches a predetermined condition, may install an application whose evaluation result is equal to or greater than a predetermined threshold, may install an application whose language matches a predetermined condition, may install an application whose permission necessary for the application matches a predetermined condition, or may install an application whose price is equal to or less than a predetermined price.

Further, in a case where an application acquired from the application distribution server 20 is started thereafter by the user's explicit selection operation and payment of a fee of the application is necessary, the information processing device 100 may present necessity of payment of the fee of the application to the user. However, regardless of whether the application is started by the user's explicit selection operation or is automatically started on the basis of reception of notification data, the information processing device 100 may present necessity of payment of the fee of the application to the user when the application is started a predetermined plurality of times or more.

Further, in a case where the user setting is a condition of automatic installation, the information processing device 100 may install, for example, an application specified by the user and an application in a category of the specified application.

Figure 10:
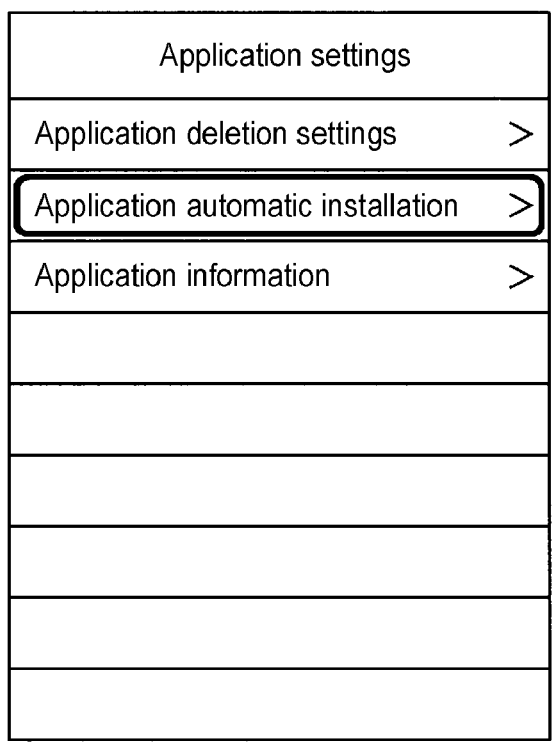
FIG. 10 is an explanatory view showing an example of a user interface.
Figure 11:
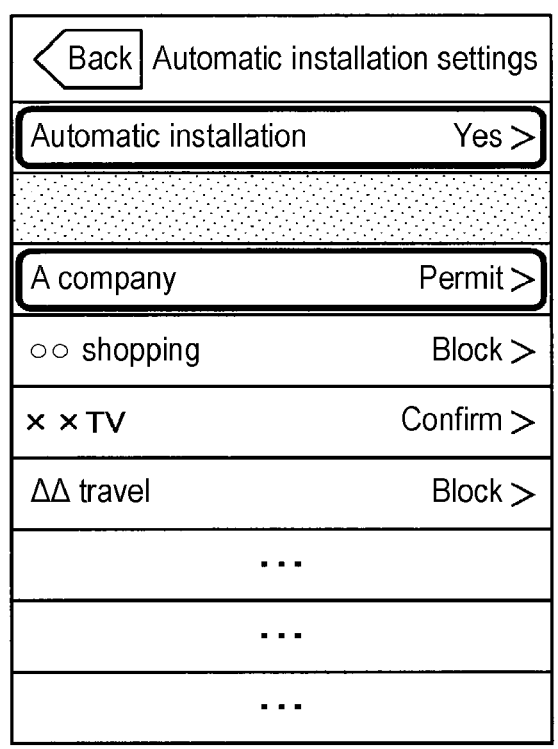
FIG. 11 is an explanatory view showing an example of a user interface.
Figure 12:
FIG. 12 is an explanatory view showing an example of a user interface.

FIGS. 10 to 12 are explanatory views showing examples of a user interface presented by the information processing device 100 to the user in order to cause the user to provide a setting for automatically installing an application. The user interfaces shown in FIGS. 10 to 12 are displayed on, for example, the display of the output device 170.

FIG. 10 is an explanatory view showing an example of a user interface that presents a list of settings regarding an application (application settings). When the user selects "Application automatic installation", the information processing device 100 transitions to a user interface that presents a list of settings regarding automatic installation of an application.

FIG. 11 is an explanatory view showing an example of a user interface that presents a list of settings regarding automatic installation of an application. FIG. 11 shows an example of a user interface that displays a user interface on which a setting regarding automatic installation of all applications and a setting regarding automatic installation of each category of an application to be installed are displayed. When the user selects a frame in which "Automatic installation" is displayed, the information processing device 100 transitions to a user interface for causing an automatic installation setting of all applications to be set. Further, when the user selects a frame in which a name of a category of an application (for example, "A company") is displayed, the information processing device 100 transitions to a user interface for causing an automatic installation setting of the category to be set.

FIG. 12 is an explanatory view showing an example of a user interface for causing the user to set an automatic installation setting of an application in a certain category. FIG. 12 shows a user interface for causing the user to set an automatic installation setting of an application provided by a certain company (A company). FIG. 12 shows an example of a user interface on which three settings, i.e., "Permit", "Confirm", and "Not permit", are displayed as an automatic installation setting. When the user selects "Permit", an application in the category is automatically installed without confirmation by the user. When the user selects "Confirm", confirmation from the user is sought before installation and, in a case where the user permits installation, an application in the category is installed. When the user selects "Not permit", an application in the category is not automatically installed.

Note that, when the user selects a frame in which "Automatic installation" is displayed on the user interface shown in FIG. 11, the user interface shown in FIG. 12 becomes a user interface for causing the user to set an automatic installation setting of all applications.

As described above, in a case where an application to be started in response to a notification is not installed, the information processing device 100 according to the embodiment of the present disclosure can automatically download the application from the application distribution server 20 and install the downloaded application. However, it is considered that the information processing device 100 receives a notification unnecessary for the user in some cases.

In a case where, when the information processing device 100 receives a notification from the notification server 10, the user determines that the notification is unnecessary and provides a setting to block the notification, the information processing device 100 does not output information based on the notification to the output device 170 even in a case where the information processing device 100 receives the notification thereafter.

In a case where, when the information processing device 100 receives a notification from the notification server 10, the user does not determine that the notification is unnecessary at that time, but, after the application is automatically installed, the user determines that the notification is unnecessary and provides a setting to block the notification, the user explicitly deletes the application that has been automatically installed. In a case where the user deletes the application, the information processing device 100 may cause the user to confirm complete deletion or partial deletion. In a case where the user selects complete deletion, the information processing device 100 does not automatically install the application thereafter, and, in a case where the user selects partial deletion, the information processing device 100 automatically installs the application.

Among applications that are automatically downloaded by the information processing device 100 from the application distribution server 20, there exists an application whose usage fee needs to be paid in order to download the application or continuously use the application. However, it is basically impossible to pay the usage fee of the application without permission of the user. In view of this, in the present embodiment, in a case where an application whose usage fee needs to be paid is automatically downloaded from the application distribution server 20, the following processing may be performed.

For example, behavior of an application may be changed between start based on a notification from the notification server 10 and explicit start based on user operation. In a case of start based on a notification from the notification server 10, the application may be usable for free, and, in a case of explicit start based on user operation, payment of a fee may be needed to use the application.

For example, there is a charged earthquake information application for providing earthquake information, and, in a case where occurrence of an earthquake of high magnitude is notified from the notification server 10 and the earthquake information application is downloaded on the basis of the notification, the earthquake information application can be used for free. Thereafter, in a case where the user explicitly starts the earthquake information application, payment of a fee may be needed to use the earthquake information application.

Further, this system can also be used as a kind of advertisement system. Conventionally, it has been possible to install an application in the terminal device 100 only by the user's manual operation, except to update an application that has already been installed. However, this system can automatically install an application in the information processing device 100 on the basis of presence/absence of a push notification, and therefore a developer of an application who desires to distribute the application to a large number of information processing devices 100 also has a strong motivation for using the system.

Thus, for example, the notification server 10 may count the number of times of transmitting notification data of each application to the information processing device 100 in the control unit 15 and hold the number of times thereof in the storage unit 12. Then, the notification server 10 may calculate an amount of fee for charging a developer of each application on the basis of the number of times of transmitting the notification data in the control unit 15 and charge the developer of the application the calculated amount of fee.

The notification server 10 or a charging server for receiving a notification of the number of times of transmission from the notification server 10 may calculate an amount of fee, and a developer of an application may execute charging with respect to the notification server 10 or a credit card or bank account registered in the charging server in advance.

Further, when each application is installed, the notification server 10 or the application distribution server 20 may receive, from the information processing device 100, a notification that the application has been installed. The notification server 10 or the application distribution server 20 can count the number of times of installing each application in the information processing device 100 in the control unit 15 or the control unit 25 on the basis of the notification, hold the number thereof in the storage unit 12 or the storage unit 22, and calculate an amount of fee to an application developer on the basis of the number thereof.

Use Case Example 1

Figure 13:
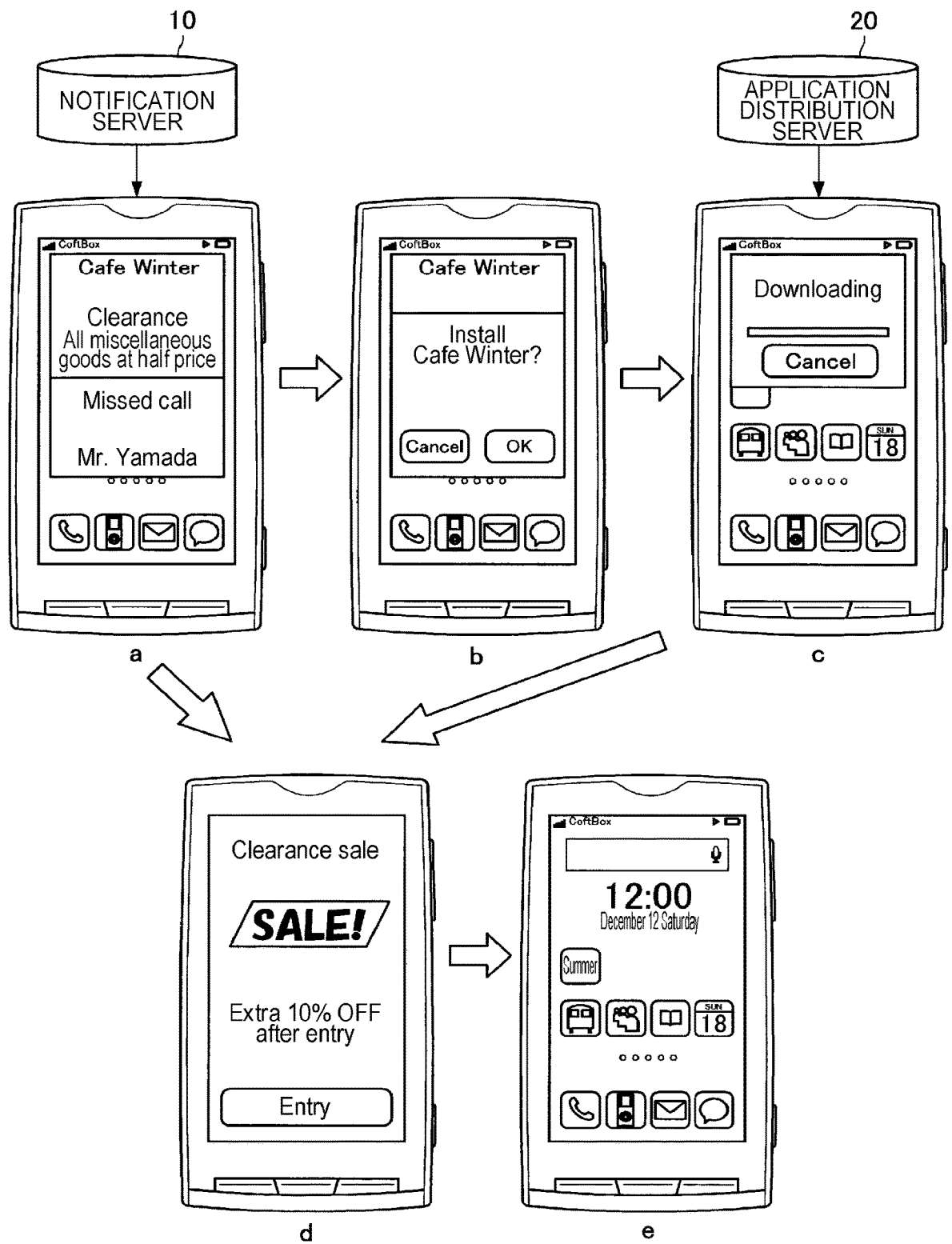
FIG. 13 is an explanatory view for describing a use case example of operation of an information processing device 100 according to an embodiment of the present disclosure.

Next, a use case example of operation of the information processing device 100 according to the embodiment of the present disclosure will be described. First, operation of the information processing device 100 performed in a case where a coupon application is distributed by considering an event to be an opportunity will be described. FIG. 13 is an explanatory view for describing a use case example of operation of the information processing device 100 according to the embodiment of the present disclosure.

The user of the information processing device 100 is assumed to register information in a net service provided by a certain store. The store distributes a notification to the information processing device 100 of the user who has registered the information from the net service via the notification server 10 because the store starts a sales event one week later. The notification processing unit 120 of the information processing device 100 displays information on the display of the output device 170 in response to reception of the notification (a).

When the user of the information processing device 100 selects the information displayed on the display, the notification processing unit 120 transfers information of an application to be started in response to the notification to the application selection unit 130 on the basis of the selection. In a case where the application is not installed, the application selection unit 130 downloads the application from the application distribution server 20. Depending on a setting, the application selection unit 130 seeks confirmation from the user before installation in some cases (b).

When the user permits installation, the application selection unit 130 downloads the application from the application distribution server 20. The information processing device 100 displays a downloading status on the display of the output device 170 as necessary (c).

In a case where the application is installed in advance or the application is downloaded from the application distribution server 20 and is installed, the information processing device 100 starts the application (d). FIG. 13 shows a state in which the application displaying information on the sales event to be held is displayed on the display of the output device 170.

When the user executes operation to terminate the application displayed on the display of the output device 170, the information processing device 100 terminates the application (e). In this use case, the application is not deleted.

FIG. 14 is an explanatory view showing an example of notification data to be transmitted from the notification server 10 to the information processing device 100. The notification data to be transmitted from the notification server 10 to the information processing device 100 is generated by, for example, the control unit 15. The information processing device 100 that has received the notification data shown in FIG. 14 can determine content to be displayed on the display or select an application to be started by analyzing content of the notification data.

As a matter of course, the notification data shown in FIG. 14 is merely an example. Although, in the present disclosure, a format of notification data is not limited to a format of the notification data shown in FIG. 14, content of elements of the notification data shown in FIG. 14 will be described.

(sender) indicates a transmission source of the notification data.

(expired) indicates a term of validity of the notification data.

(category) indicates a category of the notification data.

(urgency) indicates a degree of urgency of the notification data.

(title) indicates a title of the notification data.

(body) indicates text of the notification data.

(appInfo) indicates information of an application corresponding to the notification data.

Content of elements included in the appInfo element of the notification data shown in FIG. 14 will be described.

(name) indicates a name of the application.

(id) indicates an identifier of the application.

(sex) indicates sex of a target of the application.

(age) indicates age of a target of the application.

(url) indicates a storage location of the application in the form of URL.

(expired) indicates a term of validity of the application.

(remove) indicates a complete deletion determination flag of the application.

(installOnly) indicates an install only flag of the application.

(appData) indicates data used by the application.

By analyzing notification data written as in FIG. 14, the notification processing unit 120 can determine what application corresponds to this notification data and transfer information of the application to the application selection unit 130. In particular, when the notification processing unit 120 transfers content of an appInfo element of the notification data written as in FIG. 14 to the application selection unit 130, the application selection unit 130 can determine which application to select.

Use Case Example 2

Figure 15:
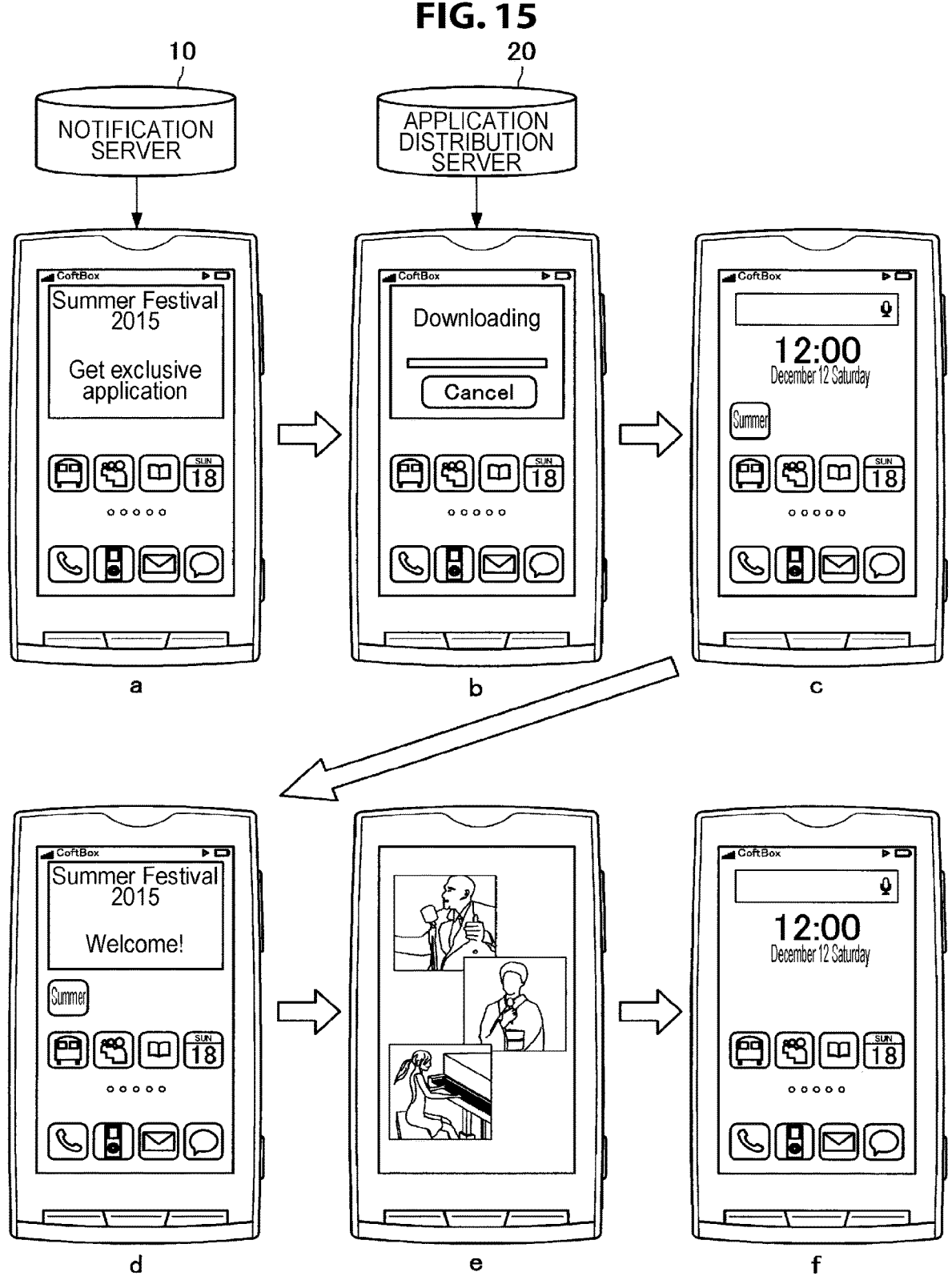
FIG. 15 is an explanatory view for describing a use case example of operation of an information processing device 100 according to an embodiment of the present disclosure.

Next, operation of the information processing device 100 performed in a case where an application is automatically started in an event hall will be described. FIG. 15 is an explanatory view for describing a use case example of operation of the information processing device 100 according to the embodiment of the present disclosure.

In a case where a large number of people gather in an event hall, such as a music event, when an application is downloaded by a large number of users at a time in a location where the event is held, a network becomes congested, and therefore it may take time to download the application or downloading itself may fail. In view of this, regarding an application of such an event in which gathering of a large number of people is expected, it is desirable to download and install the application in advance before a date at which the event is held.

The user of the information processing device 100 is assumed to register information in a net service provided by an event in which the user plans to participate. The event distributes a notification to the information processing device 100 of the user who has registered the information from the net service via the notification server 10 because the event is to be held one week later. The notification processing unit 120 of the information processing device 100 displays information on the display of the output device 170 in response to reception of the notification (a).

When the user of the information processing device 100 selects the information displayed on the display, the notification processing unit 120 transfers information of an event application to be started in response to the notification to the application selection unit 130 on the basis of the selection. In a case where the event application is not installed, the application selection unit 130 downloads the event application from the application distribution server 20 (b) and installs the event application (c). However, the event is not held yet at this time, and therefore the information processing device 100 does not start the downloaded event application.

The downloaded event application collects position information of the information processing device 100. Then, in a case where the information processing device 100 exists in an area where the event is held at a date at which the event is held, the notification server 10 transmits a notification to the information processing device 100 (d). The information processing device 100 automatically starts the event application on the basis of reception of the notification (e). When the event is terminated, the information processing device 100 may automatically delete the event application depending on a setting (f).

FIGS. 16 and 17 are explanatory views showing examples of notification data to be transmitted from the notification server 10 to the information processing device 100. The notification data to be transmitted from the notification server 10 to the information processing device 100 is generated by, for example, the control unit 15. FIG. 16 is an example of notification data to be transmitted before a date at which an event is held, and FIG. 17 is an example of notification data to be transmitted at a date at which the event is held. The information processing device 100 that has received the notification data shown in FIGS. 16 and 17 can determine content to be displayed on the display or select an application to be started by analyzing content of the notification data. In addition, in the notification data shown in FIG. 16, an install only flag (installOnly) is set to True, and therefore the information processing device 100 installs an application but does not automatically start the application. The notification data shown in FIG. 16 is transmitted from the notification server 10, and therefore a host of the event can separate a timing of downloading the application from a timing of starting the application in the information processing device 100.

Use Case Example 3

Figure 18:
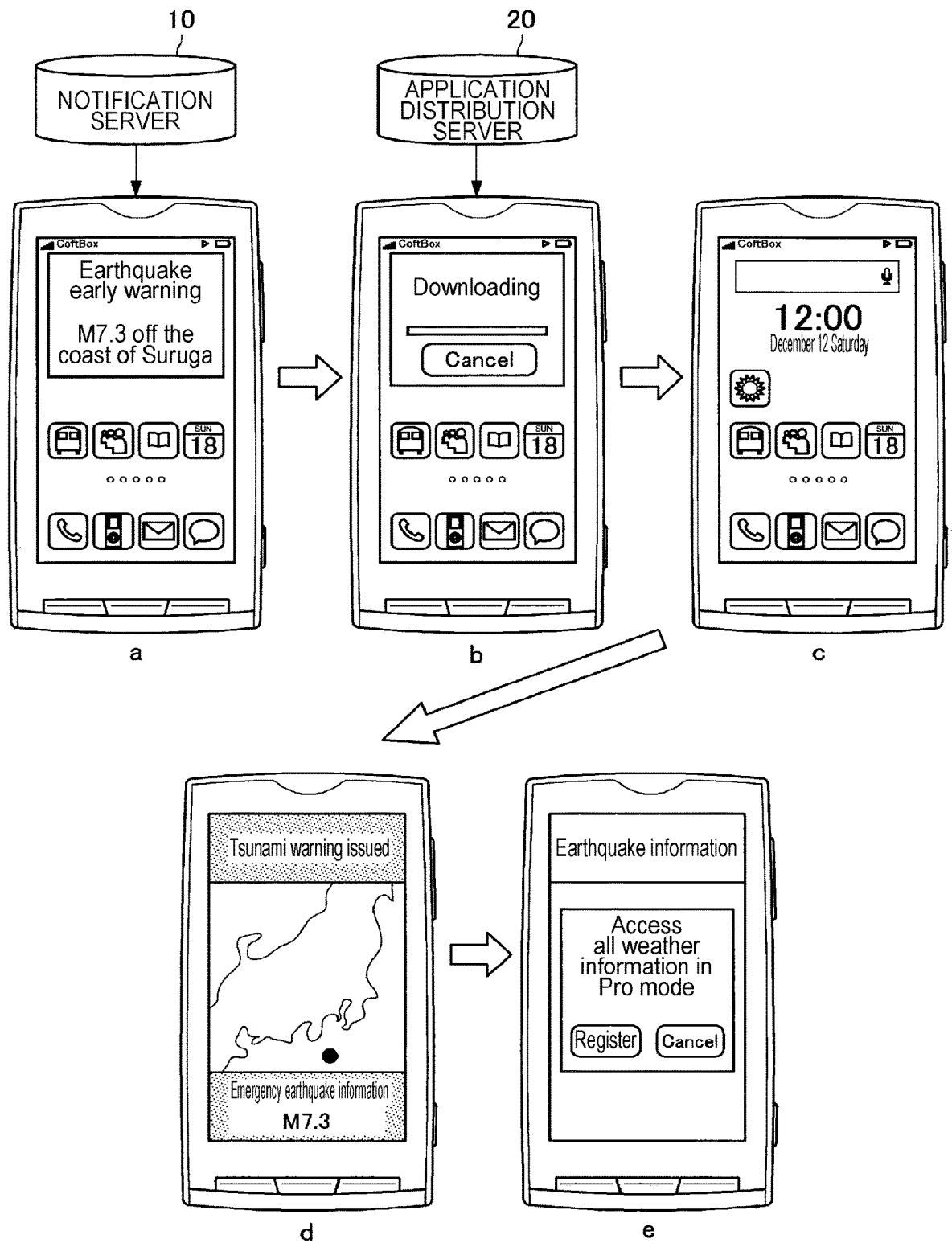
FIG. 18 is an explanatory view for describing a use case example of operation of an information processing device 100 according to an embodiment of the present disclosure.

Next, operation of the information processing device 100 performed in a case where a charged earthquake information application for displaying earthquake information is automatically started will be described. FIG. 18 is an explanatory view for describing a use case example of operation of the information processing device 100 according to the embodiment of the present disclosure.

A case where occurrence of an earthquake in the vicinity of a position of the information processing device 100 is notified from the notification server 10 on the basis of, for example, information of a current position acquired by the information processing device 100 will be described as an example. A net service for providing earthquake information transmits notification data for notifying occurrence of an earthquake from the notification server 10 to the information processing device 100. The notification processing unit 120 of the information processing device 100 displays information on the display of the output device 170 in response to reception of the notification (a).

When the user of the information processing device 100 selects the information displayed on the display, the notification processing unit 120 transfers information of an application to be started in response to the notification to the application selection unit 130 on the basis of the selection. In a case where the application is not installed, the application selection unit 130 downloads the application from the application distribution server 20. In this use case, an emergency situation that is occurrence of an earthquake is notified, and therefore the application selection unit 130 downloads the application without confirmation by the user (b) and installs the application (c). Then, the information processing device 100 displays a downloading status on the display of the output device 170 as necessary (b).

In a case where the earthquake information application is installed in advance or the earthquake information application is downloaded from the application distribution server 20 and is installed, the information processing device 100 starts the earthquake information application (d). FIG. 18 shows a state in which a screen for notifying the user that a tsunami warning has been issued with the occurrence of the earthquake is displayed on the display of the output device 170 by starting the earthquake information application. In order to start this earthquake information application, it is necessary to pay a developer of the application a usage fee under normal circumstances. However, the notification for notifying the emergency situation that is the occurrence of the earthquake is distributed from the notification server 10 to the information processing device 100, and therefore it is possible to start the earthquake information application without paying the usage fee at a time when the earthquake information application is automatically started in response to the notification of the occurrence of the earthquake.

Thereafter, the user is assumed to explicitly start the earthquake information application at a time when the tsunami warning is canceled and the situation is settled. In that case, the application starting unit 150 displays a screen showing that it is necessary to pay the usage fee on the display of the output device 170 (e).

FIG. 19 is an explanatory view showing an example of notification data to be transmitted from the notification server 10 to the information processing device 100. The notification data to be transmitted from the notification server 10 to the information processing device 100 is generated by, for example, the control unit 15. FIG. 19 is an example of notification data transmitted when an earthquake occurs. In the notification data shown in FIG. 19, "urgency" indicating a degree of urgency is "Urgent". In a case where an application is automatically started in response to notification data having a high degree of urgency as described above, the application may be started in the information processing device 100 even in a case where a usage fee of the application is not paid.

Hereinabove, the operation of the information processing device 100 according to the embodiment of the present disclosure has been described by showing the three use cases. As a matter of course, it is needless to say that the operation of the information processing device 100 according to the embodiment of the present disclosure is not limited to the above three use cases. For example, in the use case where a timing of installing an application and a timing of starting the application are different, which is shown in the use case example 2, the application to be started may be a charged application.

2. Hardware Configuration Example

Figure 20:
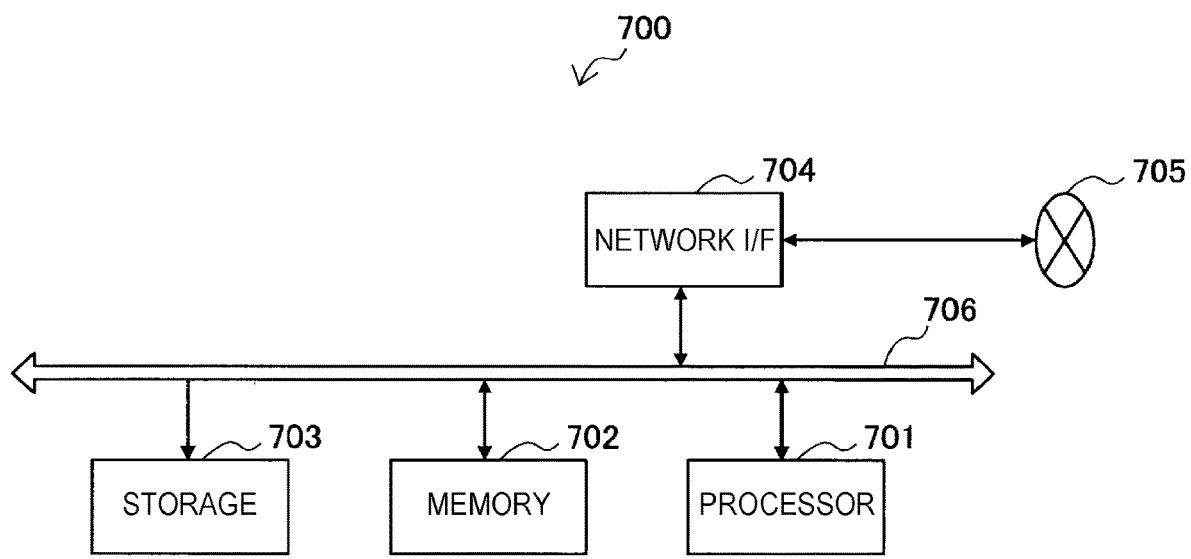
FIG. 20 is an explanatory view showing a hardware configuration example.

Next, a hardware configuration of the notification server 10 and the application distribution server 20 according to an embodiment of the present disclosure will be described with reference to FIG. 20. FIG. 20 is a block diagram showing an example of a schematic configuration of a server 700. The server 700 includes a processor 701, a memory 702, a storage 703, a network interface 704, and a bus 706.

The processor 701 may be, for example, a central processing unit (CPU) or a digital signal processor (DSP) and controls various functions of the server 700. The memory 702 includes a random access memory (RAM) and a read only memory (ROM) and stores a program executed by the processor 701 and data. The storage 703 can include a storage medium such as a semiconductor memory or a hard disk.

The network interface 704 is a wired communication interface for connecting the server 700 to a communicate network 705.

The bus 706 connects the processor 701, the memory 702, the storage 703 and the network interface 704 to one another. The bus 706 may include two or more buses having different speeds (for example, high-speed bus and low-speed bus).

In the server 700 shown in FIG. 20, one or more constituent elements (acquisition unit 14 and/or control unit 15, acquisition unit 24 and/or control unit 25) included in the processing unit 13 or the processing unit 23 described with reference to FIG. 1 may be mounted on the processor 701. As an example, a program for causing the processor to function as the above one or more constituent elements may be installed in the server 700, and the processor 701 may execute the program. As another example, a module including the processor 701 and the memory 702 may be mounted on the server 700, and the above one or more constituent elements may be mounted on the module. In this case, the above module may store the program for causing the processor to function as the above one or more constituent elements on the memory 702 and cause the processor 701 to execute the program. As described above, the server 700 or the above module may be provided as a device including the above one or more constituent elements, and the above program for causing the processor to function as the above one or more constituent elements may be provided. Further, a readable recording medium on which the above program is recorded may be provided.

Figure 21:
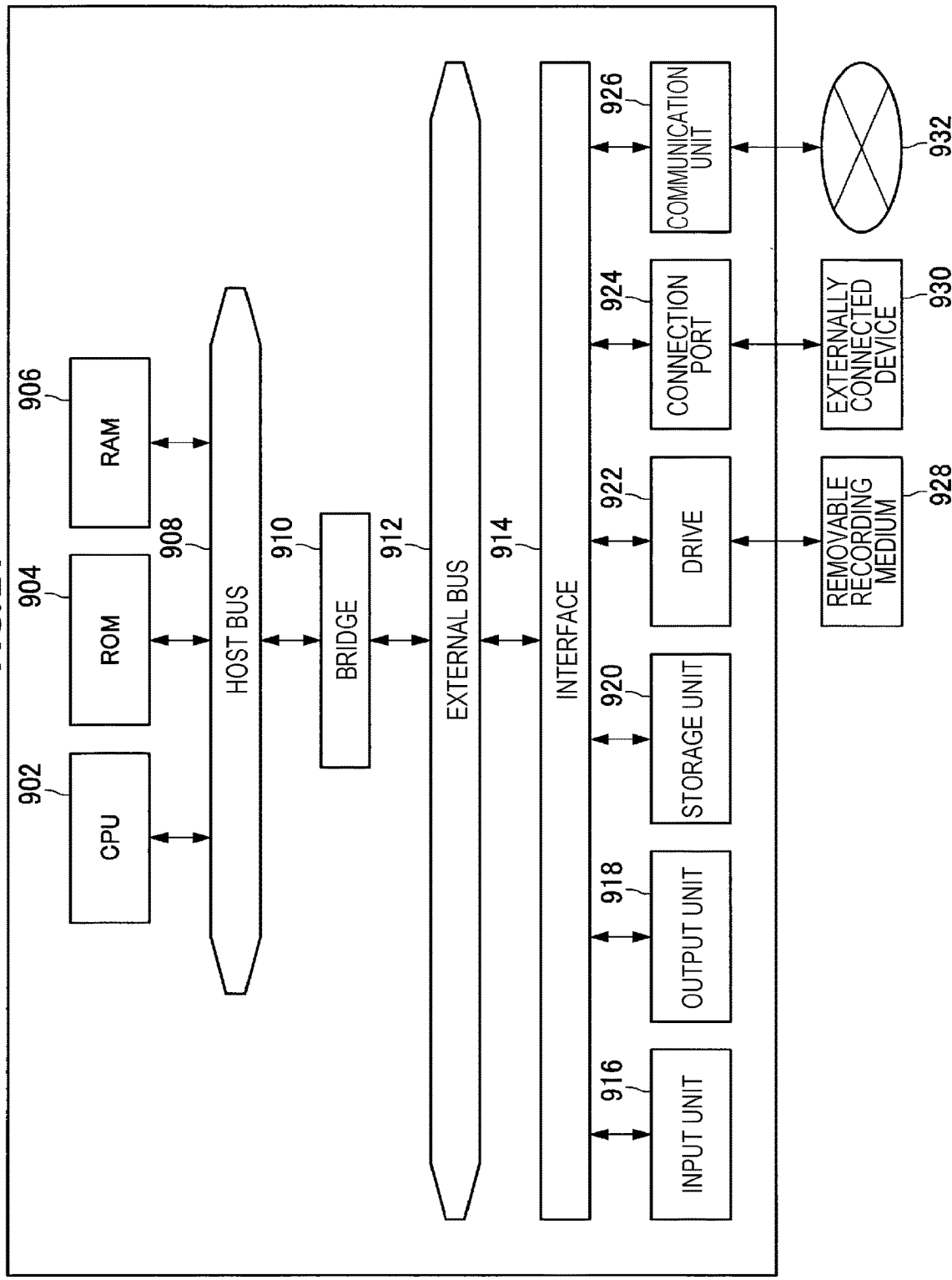
FIG. 21 is an explanatory view showing a hardware configuration example.

Next, a hardware configuration of the information processing apparatus 100 according to an embodiment of the present disclosure will be described with reference to FIG. 21. FIG. 21 is a block diagram illustrating a hardware configuration example of the information processing apparatus 100 according to the embodiment of the present disclosure. Each of the algorithms described above can be performed by using, for example, the hardware configuration of the information processing apparatus shown in FIG. 21. That is, the processing of each of the algorithms can be realized by controlling the hardware shown in FIG. 21 using a computer program.

Note that the mode of this hardware of hardware 900 shown in FIG. 21 is arbitrary, and may be, for example, a personal computer, a mobile information terminal such as a mobile phone, a PHS or a PDA, a game machine, a contact or non-contact IC chip, a contact or non-contact IC card, a loud speaker, a television set, a monitor, a wearable device, or various types of information appliances. Moreover, the PHS is an abbreviation for Personal Handy-phone System. Also, the PDA is an abbreviation for Personal Digital Assistant.

As shown in FIG. 21, this hardware 900 mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, and controls entire operation or a part of the operation of each structural element on the basis of various programs recorded on the ROM 904, the RAM 906, the storage unit 920, or a removable recording medium 928. The ROM 904 is a device for storing a program to be read by the CPU 902 or data or the like used in an arithmetic operation. The RAM 906 temporarily or perpetually stores, for example, a program to be read by the CPU 902 or various parameters or the like appropriately changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote controller that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. The CRT is an abbreviation for Cathode Ray Tube. In addition, the LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removable recording medium 928, for example, a magnetic disk, an optical disc, a magneto-optical disc, or a semiconductor memory, or writes information in the removable recording medium 928. The removable recording medium 928 is, for example, a DVD medium, a Blu-ray medium, an HD-DVD medium, various types of semiconductor storage media, or the like. Of course, the removable recording medium 928 may be, for example, an electronic device or an IC card on which a non-contact IC chip is mounted. The IC is an abbreviation for Integrated Circuit.

The connection port 924 is, for example, a USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. The USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or a device for contact or non-contact communication. In addition, the network 932 connected to the communication unit 926 is configured from a wire-connected or wirelessly connected network, and is the Internet, a home-use LAN, infrared communication, visible light communication, broadcasting, or satellite communication, for example. The LAN is an abbreviation for Local Area Network. Also, the WUSB is an abbreviation for Wireless USB. Furthermore, the ADSL is an abbreviation for Asymmetric Digital Subscriber Line.

In the hardware 900 shown in FIG. 21, at least one of constituent elements (notification processing unit 120, application selection unit 130, application starting unit 150, and application execution unit 160) included in the information processing device 100 described with reference to FIG. 1 may be mounted on the CPU 902.

3. Conclusion

As described above, according to an embodiment of the present disclosure, there is provided the information processing device 100 for, in response to reception of notification data transmitted from the notification server 10, automatically starting an application regarding the notification data. In a case where, when the application regarding the notification data is automatically started, the application is not installed, the information processing device 100 according to the embodiment of the present disclosure downloads the application from the application distribution server 20 and installs the application.

Even in a case where the application regarding the notification data is not installed by a user in advance, the information processing device 100 according to the embodiment of the present disclosure can acquire the application in response to reception of the notification data from the notification server 10 and automatically start the application.

Further, according to an embodiment of the present disclosure, there are provided the notification server 10 for transmitting notification data including application information to the information processing device 100 and the application distribution server 20 for, when a request for downloading an application corresponding to the application information is transmitted from the information processing device 100, distributing the application in response to the request.

The notification server 10 and the application distribution server 20 according to the embodiment of the present disclosure can effectively distribute an application to the information processing device 100 by transmitting notification data to the information processing device 100 used by a user. Further, by appropriately setting content of notification data, the notification server 10 according to the embodiment of the present disclosure can separate a timing of downloading an application based on reception of notification data in the information processing device 100 from a timing of automatically starting the application based on reception of notification data.

It may not be necessary to chronologically execute respective steps in the processing, which is executed by each device of this specification, in the order described in the sequence diagrams or the flow charts. For example, the respective steps in the processing which is executed by each device may be processed in the order different from the order described in the flow charts, and may also be processed in parallel.

Furthermore, it becomes possible to generate a computer program which makes a hardware device, such as a CPU, a ROM, and a RAM incorporated in each device demonstrate the functions equivalent to the configurations of the above described devices. In addition, it becomes also possible to provide a storage medium which stores the computer program. In addition, respective functional blocks shown in the functional block diagrams may be constituted from hardware devices or hardware circuits so that a series of processes may be implemented by the hardware devices or hardware circuits.

In addition, some or all of the functional blocks shown in the functional block diagrams used in the above description may be implemented by a server device that is connected via a network, for example, the Internet. In addition, configurations of the functional blocks shown in the functional block diagrams used in the above description may be implemented in a single device or may be implemented in a system in which a plurality of devices cooperate with one another. The system in which a plurality of devices cooperate with one another may include, for example, a combination of a plurality of server devices and a combination of a server device and a terminal device.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a communication unit configured to acquire information of an application that transmits a push notification to a user; and a control unit configured to automatically install the application on the basis of the acquired information.

(2)

The information processing device according to (1), in which the control unit automatically starts the installed application on the basis of the information.

(3)

The information processing device according to (2), in which, in a case where the application has already been installed, the control unit automatically starts the application on the basis of the information without installing the application.

(4)

The information processing device according to any one of (1) to (3), in which the control unit automatically installs the application on the basis of a condition of automatic installation of the application set in advance and the information.

(5)

The information processing device according to any one of (1) to (4), in which the control unit automatically uninstalls the application on the basis of the information.

(6)

The information processing device according to (5), in which the control unit determines, on the basis of the information, whether to uninstall the application including data prepared by the application.

(7)

The information processing device according to any one of (1) to (6), in which, in a case where the number of times of starting the application by user operation is equal to or greater than a predetermined number of times, the control unit executes processing for obtaining authorization to continuously use the application.

(8)

The information processing device according to any one of (1) to (7), in which, in a case where the application is started, the control unit makes operation of the application differ between in a case of automatic start based on the acquired information and in a case of start based on user operation.

(9)

The information processing device according to any one of (1) to (8), in which, in a case where the information processing device exists in a predetermined location, the communication unit acquires the information.

(10)

The information processing device according to any one of (1) to (9), in which the information includes a degree of urgency of the push notification, and the control unit automatically installs the application on the basis of the degree of urgency.

(11)

An information processing method including:

acquiring information of an application that transmits a push notification to a user; and automatically installing the application on the basis of the acquired information.

(12)

A computer program for causing a computer to execute:

acquiring information of an application that transmits a push notification to a user; and automatically installing the application on the basis of the acquired information.

(13)

A server device including a communication unit configured to transmit, to an information processing device, information of an application to be automatically installed in the information processing device on the basis of the information of the application that transmits a push notification to a user.

(14)

The server device according to (13), further including a control unit configured to manage the number of automatic installations of the application in a plurality of the information processing devices based on the information.

REFERENCE SIGNS LIST 100 information processing device
110 input device
120 notification processing unit
130 application selection unit
140 storage unit
150 application starting unit
160 application execution unit
170 output device

The invention claimed is:

1. An information processing device configured to be operated by a user and comprising:
    a transceiver;
    a display; and
    circuitry configured to perform an information processing method that includes:
    receiving a notification that includes notification information comprising:
        a transmission source of the notification,
        a term of validity of the notification,
        a geographic area of interest of the notification,
        a category of the notification,
        an identified degree of urgency of the notification, and
        information about an application related to the notification,
    wherein the information about the application related to the notification comprises:
        a name of the application,
        an identifier for uniquely identifying the application,
        a provider of the application,
        a term of validity of the application,
        a complete deletion determination flag of the application,
        an install only flag of the application,
        a starting condition of the application;
    subjecting the notification information to filtering based upon a pre-set filtering condition, wherein the pre-set filtering condition comprises:
        a notification type,
        a notification validity,
        application information,
        related application information,
        feedback by the user on a past notification,
        a profile of the user, and
        a user context;
    if the notification information passes the filtering:
        determining that satisfactory free space is available for installing an application related to the notification; and
        if satisfactory free space is available:
            automatically downloading and installing the application related to the notification; and
    if the notification information does not pass the filtering, not automatically installing the application, and installing the application based upon a subsequent user input.

2. The information processing device according to claim 1, wherein the information processing method performed by the circuitry further includes:
    automatically starting the application related to the notification after the application is installed, or
    starting the application based on a user input that is received after the application is installed.

3. The information processing device according to claim 1, wherein the information processing method performed by the circuitry further includes:
    receiving a second notification after the application is installed; and
    one of automatically starting the application based on the second notification or starting the application based on a user input that is received after the second notification.

4. The information processing device according to claim 1, wherein the information processing method performed by the circuitry further includes automatically uninstalling the application based on the term of validity of the application received in the notification.

5. The information processing device according to claim 4, wherein the information processing method performed by the circuitry further includes uninstalling data associated with the application based on the complete deletion determination flag.

6. The information processing device according to claim 1, wherein the information processing method performed by the circuitry further includes, in a case where a number of times of starting the application by operation by the user of the information processing device is equal to or greater than a predetermined number of times, obtaining authorization to continue to use the application.

7. The information processing device according to claim 1, wherein the information processing method performed by the circuitry further includes starting the application based on the starting condition.

8. The information processing device according to claim 1, wherein the information processing method performed by the circuitry further includes processing or not processing the information about the application related to the notification based on the notification information.

9. The information processing device according to claim 1, wherein the information about the application related to the notification further comprises:
    a gender of a target user of the application,
    an age of the target user of the application,
    a language of the application, and
    an application permission status of the user.

10. The information processing device according to claim 1, wherein the information processing method performed by the circuitry further includes displaying at least one of a downloading status or an installation status of the application related to the notification while downloading or installing the application.

11. The information processing device according to claim 1, wherein the information processing method performed by the circuitry further includes:
when a value of the complete deletion determination flag is True, the application and corresponding data are deleted at a time of deletion, and
when a value of the install only flag is True, the application is installed without initiating the application.

12. The information processing device according to claim 1, wherein, based on the starting condition, the information processing method performed by the circuitry further includes:
starting the application only in response to a subsequent notification, or
starting the application by user operation.

13. The information processing device according to claim 1, wherein:
the profile of the user includes at least one of an age profile of the user or a gender profile of the user, and
the user context includes at least one of an activity status of the user, a behavior of the user obtained by analyzing sensing data, or application category start statistics.

14. An information processing method performed by an information processing device configured to be operated by a user, the information processing device including a transceiver, processing circuitry and a display, the information processing method performed by the processing circuitry and comprising:
receiving a notification that includes notification information comprising:
a transmission source of the notification,
a term of validity of the notification,
a geographic area of interest of the notification,
a category of the notification,
an identified degree of urgency of the notification, and
information about an application related to the notification,
wherein the information about the application related to the notification comprises:
a name of the application,
an identifier for uniquely identifying the application,
a provider of the application,
a term of validity of the application,
a complete deletion determination flag of the application,
an install only flag of the application,
a starting condition of the application;
subjecting the notification information to filtering based upon a pre-set filtering condition, wherein the pre-set filtering condition comprises:
a notification type,
a notification validity,
application information,
related application information,
feedback by the user on a past notification,
a profile of the user, and
a user context;
if the notification information passes the filtering:
determining that satisfactory free space is available for installing an application related to the notification; and
if satisfactory free space is available:
automatically downloading and installing the application related to the notification; and
if the notification information does not pass the filtering, not automatically installing the application, and installing the application based upon a subsequent user input.

15. A non-transitory computer readable medium storing a computer program for causing a computer o execute the information processing method of claim 14.

* * * * *